(12) United States Patent
Asher et al.

(10) Patent No.: US 11,663,517 B2
(45) Date of Patent: May 30, 2023

(54) AUTOMATIC MACHINE LEARNING MODEL GENERATION

(71) Applicant: Salesforce, Inc., San Francisco, CA (US)

(72) Inventors: Sara Beth Asher, Atherton, CA (US); John Emery Ball, San Francisco, CA (US); Vitaly Gordon, Sunnyvale, CA (US); Till Christian Bergmann, San Mateo, CA (US); Kin Fai Kan, Sunnyvale, CA (US); Chalenge Masekera, Oakland, CA (US); Shubha Nabar, Sunnyvale, CA (US); Nihar Dandekar, Sunnyvale, CA (US); James Reber Lewis, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 1438 days.

(21) Appl. No.: 15/884,878

(22) Filed: Jan. 31, 2018

(65) Prior Publication Data

US 2019/0138946 A1 May 9, 2019

Related U.S. Application Data

(60) Provisional application No. 62/581,624, filed on Nov. 3, 2017.

(51) Int. Cl.
*G06N 20/00* (2019.01)
*G06N 5/02* (2023.01)
*G06N 5/04* (2023.01)

(52) U.S. Cl.
CPC ............... *G06N 20/00* (2019.01); *G06N 5/02* (2013.01); *G06N 5/04* (2013.01)

(58) Field of Classification Search
CPC ............ G06N 20/00; G06N 5/02; G06N 5/04; G06N 20/20
USPC .......................................................... 706/12
See application file for complete search history.

(56) References Cited

U.S. PATENT DOCUMENTS

2018/0052898 A1\* 2/2018 Allan ........................ G06F 8/34

OTHER PUBLICATIONS

Kanter James Max, "Deep Feature Synthesis: Towards Automating Data Science Endeavors," IEEE, (2015) (Year: 2015).\*
Gao Yu-Fei, "Prediction of active sites of enzymes by maximum relevance minimum redundancy (mRMR) feature Selection," NCBI, (2013) (Year: 2013).\*

(Continued)

*Primary Examiner* — Tsu-Chang Lee
(74) *Attorney, Agent, or Firm* — Holland & Hart LLP

(57) ABSTRACT

A system may automatically generate a predictive machine learning model by automatically performing various processes based on an analysis of the data as well as metadata associated with the data. The system may accept a selection of data and a prediction field from the data. The system may automatically generate a set of features based on the data and may automatically remove certain features that cause inaccuracies in the model. The system may balance the data based on a representation rate of certain outcomes. The system may train and select a model based on several candidate models. The system may then perform the predictions based on the selected model and send an indication of the predictions to a user.

20 Claims, 15 Drawing Sheets

(56) References Cited

OTHER PUBLICATIONS

Kanter et al., "Deep Feature Synthesis: Towards Automating Data Science Endeavors", IEEE International Conference on Data Science and Advanced Analytics (DASS), Oct. 19-21, 2015 (Year: 2015).*

Gao et al., "Prediction of active sites of enzymes by maximum relevance minimum redundancy (mRMR) feature Selection", Molecular BioSystems, 2013, 9, 61-69 (Year: 2013).*

* cited by examiner

AUTOMATIC MACHINE LEARNING MODEL GENERATION

CROSS REFERENCE

The present Application for Patent claims priority to U.S. Patent Application No. 62/581,624 by Asher et al., entitled "AUTOMATIC MACHINE LEARNING MODEL GENERATION," filed Nov. 3, 2017, assigned to the assignee hereof, and expressly incorporated by reference herein.

FIELD OF TECHNOLOGY

The present disclosure relates generally to database systems and data processing, and more specifically to automatic machine learning model generation.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A user of a CRM application may wish to predict values for certain fields of data using a predictive model. Such systems may include a user interface with a number of fields to manually enter data, identifiers, or any content associated with the prediction sought by the user. For example, the user interface may include fields to manually select certain parameters related to the predictive model, such as a definition of the relationships within the data, a selection of appropriate algorithms to use, tuning parameters of the algorithms, etc. Furthermore, the system may require that the data to be used for building the predictive model be manually tailored such that it is suitable for building a model. Without specialized statistical training, knowledge of such parameters may be unknown to a user. The system may require that these fields be filled in before a prediction will be created. In some cases, the user may manually enter data into the input fields that may be incorrect or incomplete, and may result in the system providing an inaccurate prediction or, in some cases, the system may be unable to provide a prediction altogether, given the input.

DETAILED DESCRIPTION

Figure 1:
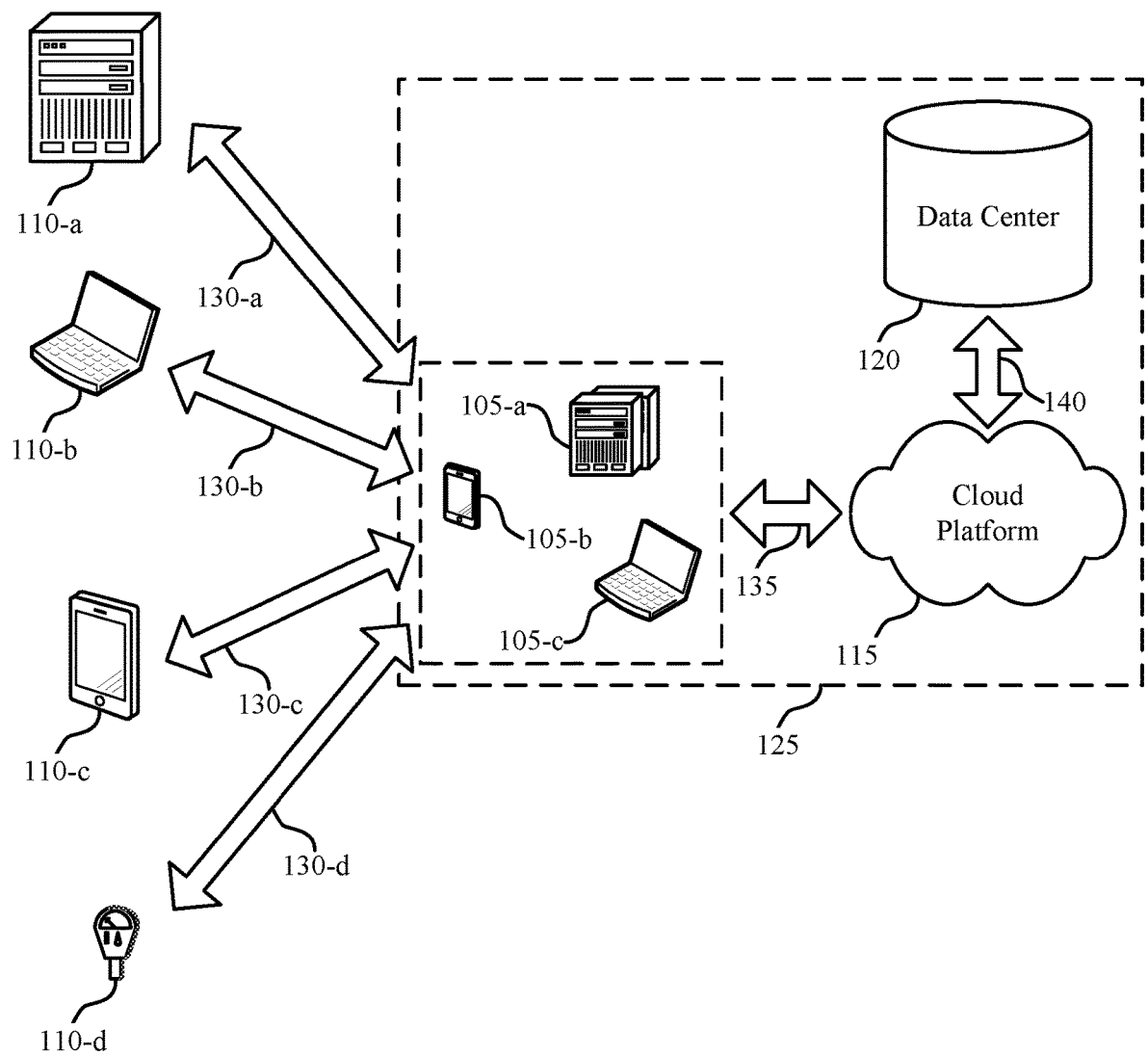
FIG. 1 illustrates an example of a system for generating a predictive machine learning model that supports automatic machine learning model generation in accordance with aspects of the present disclosure.

When a user seeks to generate a prediction using machine learning, the prediction is usually generated based on several user-defined inputs. However, given any one user's familiarity with data science, the accuracy of the prediction may be wide-ranging. Further, the accuracy of a prediction may be directly correlated to the quantity and accuracy of the received input. Thus a typical user without specialized statistical training (e.g., an administrator, a sales manager, etc.) may be unable to build accurate predictive models because of the manual selection process required. However, in accordance with aspects of the present disclosure, by receiving a selection of a data set and a selection of a prediction field—for example, via a wizard or a simplified user interface—a system may be configured to automatically generate a predictive model by choosing the necessary parameters based on an automatic analysis of the data (e.g., based on metadata associated with the data), thereby reducing or eliminating the need for the user to generate any code or to understand the data science being used to automatically select the parameters.

In a first example, a predictive machine learning model may be generated. A database server may receive a selection of a data set that may include a plurality of fields. In some examples, the data set may include an object—a representation of a type of structured data. Thus the plurality of fields may represent subsets of the structured data (e.g., rows in a table). The database server may subsequently receive a selection of a prediction field for use in generating the prediction. The database server may automatically generate a plurality of features from the data set and then may automatically remove certain features that cause inaccuracies in the predictive model. This automatic feature generation and selection process may be performed by the database server based on metadata associated with the data (e.g., knowing that a string of characters is actually an email address). The database server may then generate a predictive learning model based on the plurality of features and may transmit an indication of a plurality of predicted values for the prediction field based in part on the predictive machine learning model.

In another example, a predictive machine learning model may be generated by first receiving, at a database server, a selection of a data set that may include a plurality of fields. The database server may subsequently receive a selection of one or more prediction fields for use in generating the prediction. The database server may generate a plurality of features from the data set and may then generate a predictive learning model based on the plurality of features. The database server may then evaluate a statistical relationship (e.g., a correlation or a Cramer's V calculation) between the plurality of predicted values generated by the predictive learning model and, in some examples, remove at least one feature of the subset of features. This process may be referred to as a "sanity checker." In some examples the evaluation may be based on a correlation between the data set and the prediction field. In other examples, the evaluation may be based on a nominal association, such as Cramer's V. In some examples, the removal of certain features may result in a more-accurate prediction by not considering potentially extraneous relationships in the determination of the predicted values. In some examples, the database server may transmit an indication of a plurality of predicted values for the prediction field based in part on the predictive machine learning model.

In yet another example, a predictive machine learning model may be generated by first receiving, at a database server, a selection of a data set that may include a plurality of fields. The database server may generate a plurality of features from the data set and may then generate a predictive learning model based on the plurality of features. In some examples, the database server may generate a predictive learning model based on training a plurality of candidate machine learning models. For example, the database server may evaluate a plurality of machine learning models based in part on a predictive accuracy of the model. The database may then, for example, select the predictive machine learning model based in part on the evaluation. This may result in a more-accurate determination of the predicted values. In some examples, the database server may transmit an indication of a plurality of predicted values for the prediction field based in part on the predictive machine learning model.

In another example, a predictive machine learning model may be generated by first receiving, at a database server, a selection of a data set that may include a plurality of fields. The database server may generate a plurality of features from the data set and may then generate a predictive learning model based on the plurality of features. After determining the predictive learning model, in some examples, the database server may determine a plurality of scores for the prediction field based in part on generating the model. The database server may receive a new record associated with the data set and update the scores for the prediction field based in part on the new record. This process may be done in real time and may lead to updated determinations of the predicted values. In some examples, the database server may transmit an indication of a plurality of predicted values for the prediction field based in part on the predictive machine learning model.

In another example, the predictive machine learning model may improve one or more business processes or workflows within a company, by making the processes more intelligent or more efficient. For example, employees may need more insights into the future and may need to deflect repetitive tasks that take up their days. However, companies may be hindered by the infrastructure costs, lack of expertise, and the resources required to optimize their workflow with AI. With a predictive machine learning model, the employees who are actually managing and driving business processes may have the power to build and customize AI apps to fit their specific needs. By using selections—such as clicks—the declarative setup guide may walk users through building, training, and deploying AI models using structured and unstructured data, such as metadata. The predictive machine learning model may automate the model building and data scoring process, and custom predictive models and bots may be easily embedded directly into workflows. The models may automatically learn and improve as they're used, delivering accurate, personalized recommendations and predictions in the context of business.

For example, the predictive machine learning model may allow users to create custom AI models on any field or object—custom or standard—to predict business outcomes, such as a customer's likelihood to churn or the lifetime value of an account. For example, an admin at a financial services company may build a predictive attrition model to understand which customers are most likely to churn based on any fields related to the account, such as the number of external accounts they link to their checking account and history of customer support calls. Using a declarative, point-and-click setup tool, users may define the prediction, identify the field to build the model on, and select which data to use. The attrition score may be based on these signals, and may be directly embedded into a customer account page and create a task, automatically alerting users to high-risk customers, so the user may deliver personalized, one-on-one interactions to reduce attrition risk.

Aspects of the disclosure are initially described in the context of an environment supporting an on-demand database service. Further aspects of the disclosure are described with respect to systems that support automatic machine learning model generation, such as at a database server. Aspects of the disclosure are further illustrated by and described with reference to apparatus diagrams, system diagrams, and flowcharts that relate to automatic machine learning model generation.

FIG. 1 illustrates an example of a system 100 for cloud computing that supports automatic machine learning model generation in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud clients 105 of subsystem 125 may be examples of one or more computing devices and data center 120 may be an example of or include, as a component, a database server to which a cloud client 105 may attempt to connect with. In accordance with aspects of the present disclosure, the data center 120 may be configured to automatically build or generate a predictive model based on inputs selected by a user via a could client 105. For example, data center 120 may receive a selection of a data set, which may include a plurality of fields. The data set may be received in response to a customer seeking a prediction of an outcome, given a particular data set. In some examples, the data center 120 may receive a selection of a prediction field from the plurality of fields. The selection may be made, for example, at a user interface of cloud client 105. The data center 120 may then generate a plurality of features from the data set.

In some examples, the features may be generated automatically based on metadata associated with the data set. Upon generating the plurality of features, the data center 120 may generate a predictive learning model—for use in generating a prediction—based in part on the plurality of features. The data center 120 may then transmit, for example to cloud client 105—an indication of a plurality of predicted values for the prediction field based in part on the predictive machine learning model. As described in more detail below, the generation of the predictive model by data center 120 may be facilitated by a user interface at a cloud client 105 (e.g., a wizard).

Figure 2:
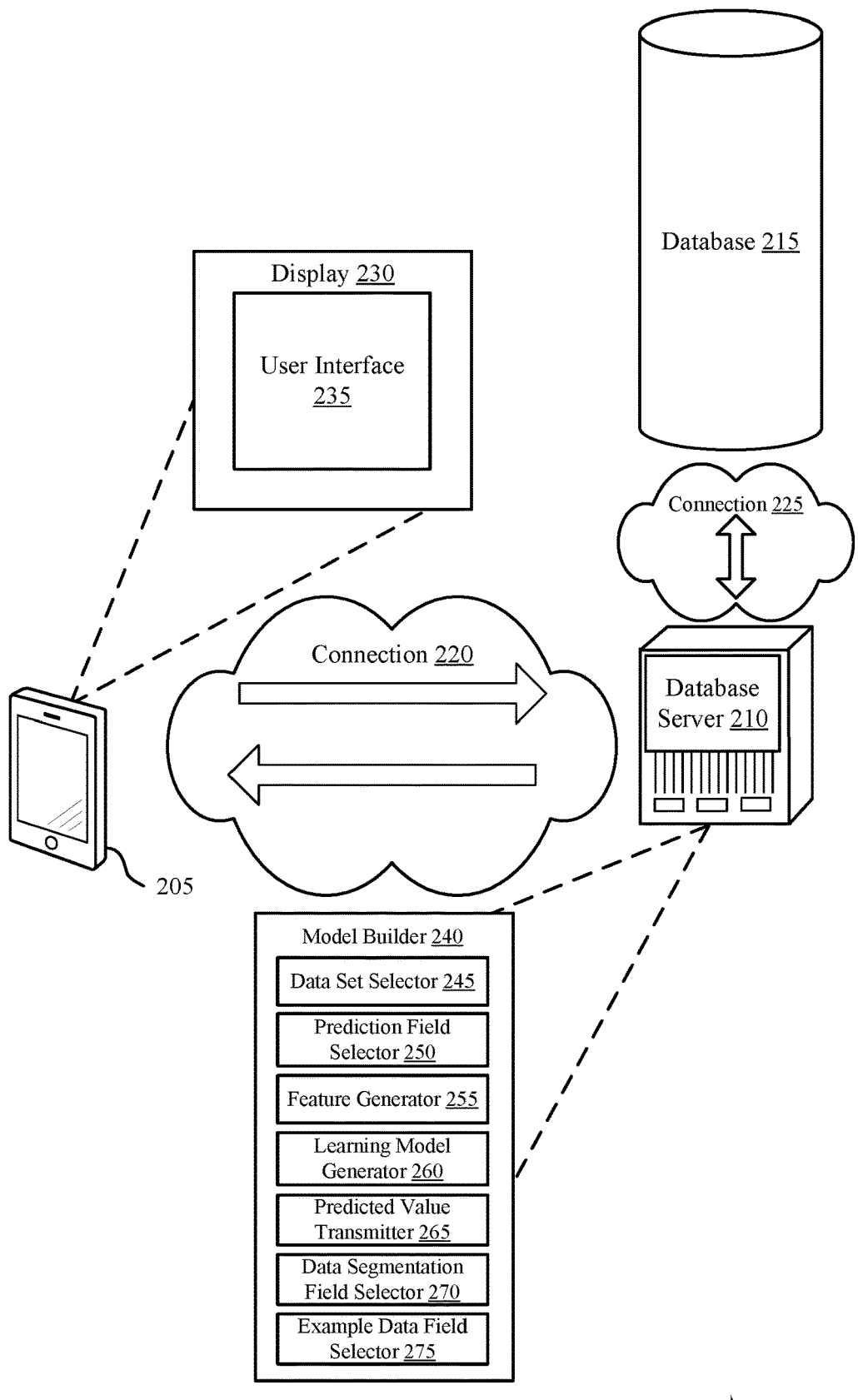
FIG. 2 illustrates an example of a database system that supports automatic machine learning model generation in accordance with aspects of the present disclosure.

FIG. 2 illustrates an example of a system 200 that supports generating a predictive machine learning model in accordance with various aspects of the present disclosure. The system 200 may include a computing device 205, which may be an example of a cloud client 105 as described with reference to FIG. 1; a database server 210, which may be an example of the data center 120 as described with reference to FIG. 1; and a database 215. In some cases, the database server 210 may be an example of components of a data center 120, a cloud platform 115, or some combination of these, as described with reference to FIG. 1. The system 200 may also include one or more connections, such as connection 220 and connection 225. In some examples, the computing device 205 may include display 230 and user interface 235. The database server 210 may include model builder 240, which may include a plurality of modules—including data set selector 245, prediction field selector 250, feature generator 255, learning model generator 260, and predicted value transmitter 265. In some examples, the database server 210 may be a multi-tenant database server. In other examples, the database server 210 may be an example of or include a predictive model platform.

In some examples, the computing device 205 may display a user interface 235 via a display 230. The user interface 235 may contain one or more fields to receive user input. For example, the fields may receive user input that includes a prediction name, a prediction type, an Application Program Interface (API) name, an object prediction, or a field prediction, among others. In some examples, the fields may be associated with receiving a selection of a data set or receiving a selection of a prediction field. In other examples, the fields may be associated with receiving an indication of one or more objects. Additionally or alternatively, for example, a user may input each of the prediction name, the prediction type, the API name, the object prediction, or the field prediction. In other examples, the user may input the object prediction or the field prediction by selecting one or more objects or fields to predict from, for example, a populated list of objects or fields.

Upon receiving the user input, database server 210 may receive a selection of a data set. The data set may include data stored on database 215 that is associated with a CRM account. In some examples, the data set may include a plurality of fields. The database server 210 may receive the data set, for example, at data set selector 245. The data set received by database server 210 may, be structured as one or more objects. For example, the data set, or the object, may be a representation of a type of structured data. Thus the plurality of fields included in the data set may be or may be indicative of specific types or subsets of structured data. In some examples, selecting objects (e.g., at data set selector 245) may facilitate feature generation. For example, selecting additional objects may filter the amount of features capable of being generated. An example of an object may be "account," "contact," or "case." By selecting multiple objects (e.g., "account" and "contact"), a more accurate listing of features may be generated, than if only one object (e.g., "case") was selected. In other examples, the database server 210 may receive an indication of one or more additional objects (e.g., a related object). In either example, the database server 210 may receive the selection of the data set from computing device 205 via connection 220. The selection of the object or data set may be facilitated by the user interface 235 such that a user can click or otherwise select an existing object within the data set.

In some examples, user input may allow for a data set to be segmented. For example, a user may wish to generate a predictive machine learning model based on a specific set of data. Thus database server 210 may receive a selection of one or more fields (e.g., an indication of a specific data set), which may be indicative of specific types or subsets of structured data. For example, a user may wish to segment the data based on a field such as "contact opportunities" (e.g., leads) that are "worth more than $1 million." Thus, this parameter may be taken into account when generating the predictive machine learning model. The data set segmentation may occur at data segmentation field selector 270.

Upon receiving the selection of the data set, database server 210 may receive a selection of a prediction field from the plurality of fields. A prediction field may refer to the field of data for which the user wishes the database server 210 to perform a prediction. As described above, the plurality of fields included in the data set may be or may be indicative of specific types or subsets of structured data. Thus, in the example of the object "contact," an example of an associated field may be "e-mail address." The selection of the prediction field may occur at prediction field selector 250.

In other examples, user input may allow for an indication of example data for use in generating a predictive machine learning model. Stated another way, a user may indicate which fields include accurate data, and which fields to predict. Thus, a predictive machine learning model may be based on scenarios that previously occurred (e.g., using the accurate data). For example, a user may indicate that the fields "contact opportunities" and "worth more than $1 million." The user may indicate one or more prior contacts that closed with sales of greater than $1 million (e.g., accurate data). The user may also indicate that he or she wishes to use these examples (e.g., prior examples) as example data for use in predicting a lead (e.g., a suitable client). Thus the user may also indicate that he or she wishes to use the "contact opportunities" field to predict the lead. The accurate data may be taken into account when generating the predictive machine learning model. This data selection may occur at example data field selector 275.

The database server 210 may, in some examples, automatically generate a plurality of features from the data set after receiving the selection of the prediction field. The generation of the plurality of features may occur at feature generator 255. The database server 210 may generate the plurality of features automatically based in part on metadata associated with the data set. The metadata may include a characteristic of the data and a data type. For example, the type of data may be a string and the characteristic of the data may be that the string is an email address. As another example, the data type of the data may be a number of integer and the characteristic of the data may be that the number is a phone number. The metadata may be stored on and received by the database server 210, for example, from database 215 via connection 225. The metadata stored in database 215 may be available because the data may be stored in a CRM application that analyzes and understands these characteristics of the data. In some examples, database 215 may be an example of a multi-tenant database.

The database server 210 may then automatically evaluate and potentially remove certain features that where automatically generated from the predictive model. For example, the database server 210 may evaluate a statistical relationship between the plurality of predicted values for the prediction field and a subset of the plurality of features. The database server 210 may remove at least one feature of the subset of the plurality of features from the predictive machine learning model if the statistical relationship exceeds a threshold that indicates that the feature is unsuitable for inclusion in the model. Stated alternatively, the database server 210 may determine if any of the features are outliers or are too predictive of the predictive value. This determination may be based on a threshold value—for example, whether too high or too low of a correlation between the predicted values and the subset of features exist. In such an instance, for example, the database server 210 may remove the feature of the subset from the predictive learning machine, which may result in fewer data outliers and, subsequently, a more-accurate prediction model.

In some examples, the database server 210 may adjust a sampling rate of the data to balance out relative representations of the data. For example, the database server 210 may oversample data that predicts underrepresented predictive value. For example, if a relatively small set of the data set is predictive of one predictive outcome, then this small set of data may be oversampled with respect to other data in the data set such that the predictive model is not biased towards the predictive outcome represented by the relatively larger set of data. This automatic balancing of the data may result in a more accurate predictive model.

In other examples, the database server 210 may automatically generate a predictive learning model based in part on the plurality of features. For example, the database server 210 may generate the predictive learning model at learning model generator 260. In other examples, the database server 210 may generate the predictive learning model based on training a plurality of candidate machine learning models. The plurality of candidate machine learning models may include any number of machine learning algorithms used in predictive model building. The database server 210 may then evaluate the plurality of candidate machine learning models. This evaluation may be based in part on a predictive accuracy of each of the machines. The database server 210 may subsequently select the predictive machine learning model based in part on the evaluation (e.g., based on which model is most accurate, or is otherwise best suited for the selected data set or the desired predictive value).

Upon generating the predictive learning model, as described above, the database server 210 may generate scores based on the model (e.g., predictive values for selected field). In some examples, the database server 210 may also generate an explanation as to why a particular score was generated. For example, a score may relate to a risk of attrition and the explanation (e.g., reasoning) for the given score may be that "the individual has opened bank accounts with external companies." The database server 210 may then transmit an indication of the predicted values for the prediction field based in part on the predictive machine learning model. In some examples, the database server 210 may perform one or more statistical analyses on the predictive machine learning model prior to transmitting the indication of the values. For example, the statistical analyses may aid in a determination of the viability of the model. Based on the statistical analyses, the database server 210 may determine whether the model contains requisite information to generate accurate predictive scores. The database server 210 may transmit the plurality of predicted values by predicted value transmitter 265, by connection 220, to computing device 205. In some examples, the score may be determined based in part on selecting the predictive learning model from the plurality of candidate machine learning models. In some examples, the database server 210 may receive a new record associated with the data set. For example, additional data may be received from database 215. The database server 210 may then update the score for the prediction field based in part on the new record. This score may be stored at, for example, the database server 210 or the database 215. In some examples, the plurality of predicted scores, the plurality of predicted values, or both may be saved to the database server 210 or the database 215 based in part on transmitting the indication of the plurality of predicted values.

Figure 3:
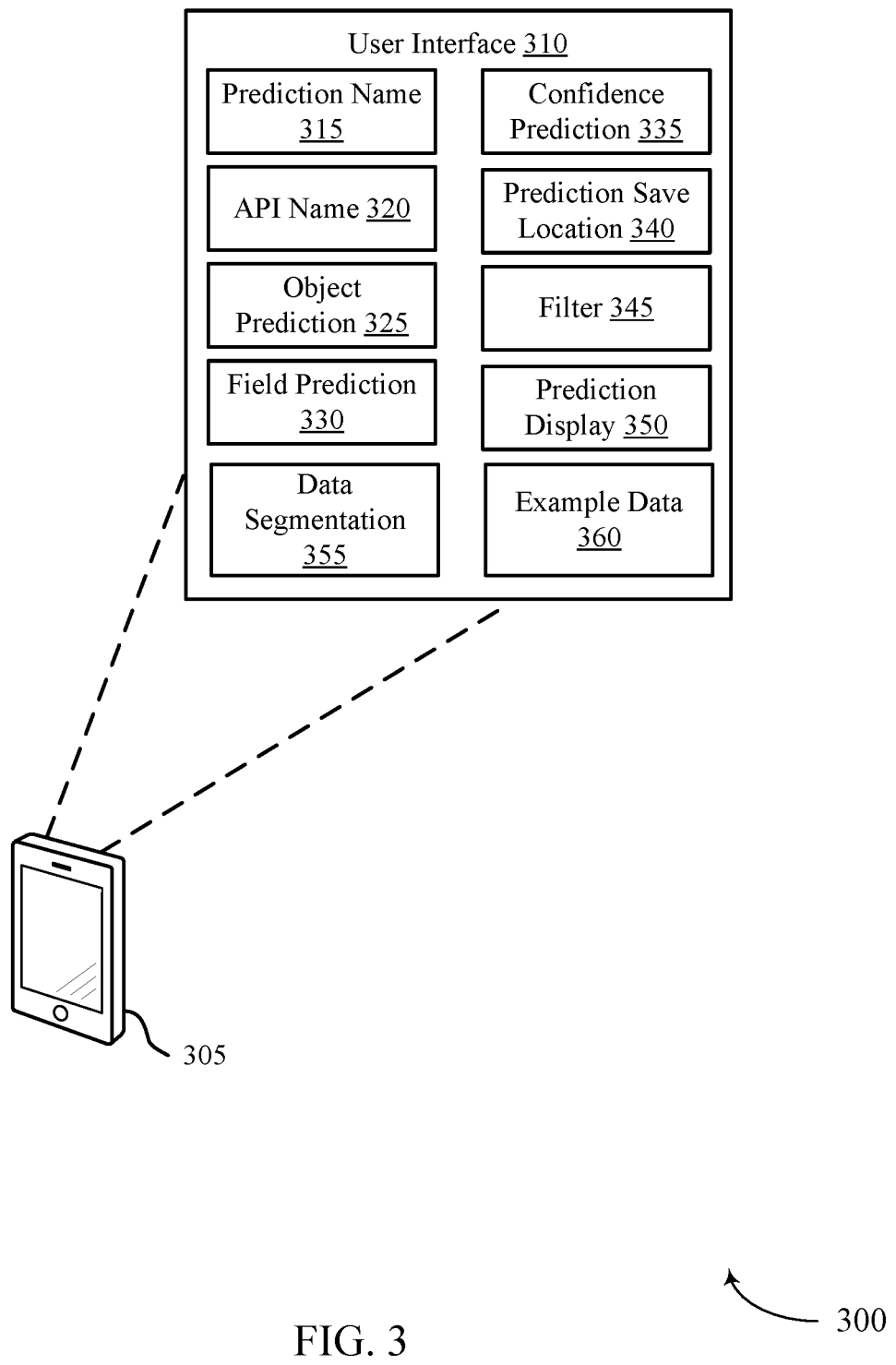
FIG. 3 illustrates an example of a user interface that supports automatic machine learning model generation in accordance with aspects of the present disclosure.

FIG. 3 illustrates an example of a system 300 that supports generating a predictive machine learning model in accordance with various aspects of the present disclosure. The system 300 may include a computing device 305, which may be an example of a computing device 205 as described with reference to FIG. 2. The computing device 305 of system 200 may include a user interface 310, which may be an example of the user interface 235 as described with reference to FIG. 2. The user interface 310 may include input fields 315, 320, 325, 330, and 345, 355, and 360 which may correspond to input fields for a prediction name, an API name, object prediction, field prediction, a data filter, a data segmentation field selector, and an example data field selector, respectively. The user interface 310 may also include display fields 335 and 350, which may correspond to a confidence prediction and a prediction display, respectively. The user interface 310 may also include additional input fields or display fields that are not shown.

As described above, the computing device 305—via the user interface 310—may receive a selection of a data set and a selection of a prediction field. In some examples, the user interface 310 may be or may be an example of a wizard and may direct a user in a step-by-step input process. For example, the user may first input a prediction name 315, an API name 320, or both to identify the prediction. Subsequently, for example, the user may input a selection of a data set that may include, for example, an object prediction 325, a field prediction 330, or both. This may be an example of a user inputting a selection of a data set, a selection of a prediction field from a plurality of fields, or both. In some examples, the user may manually input these fields, or may select input from a pre-populated list. When using a wizard for example, a user may be automatically navigated through multiple interfaces, each containing one or more input field. In such an example, each subsequent input field in the wizard may depend on the input received in the previous field. For example, a user may select a data set and, at a subsequent stage, may select a prediction field from a pre-populated list based on the data set selected.

In other examples, a user may input a prediction save location 340 and may also choose to filter 345 the data to be received. For example, a user may select a particular data set, a particular location (e.g., local to computing device 305) or a database, or some other location to save the prediction to. In the instance that the prediction is saved to a particular data set, future predictions using the same data set may be improved. Stated alternatively, the predictive machine learning model may utilize the prediction or data associated with the prediction to improve its accuracy in generating a future prediction.

Upon receiving the user-defined input, the input may be received at a database server (e.g., database server 210 as described with reference to FIG. 2). The database server may, for example, generate a plurality of features from the data set. In some examples the database server may generate the plurality of features automatically based in part on metadata associated with the data set. In some examples, the database server may generate a predictive learning model based in part on the plurality of features. The database sever may then transmit an indication of a plurality of predicted values to the computing device 305. The indication may be displayed at prediction display 350. In other examples, the database server may transmit a confidence prediction 335, which may indicate to a user a confidence level associated with the prediction.

Figure 4:
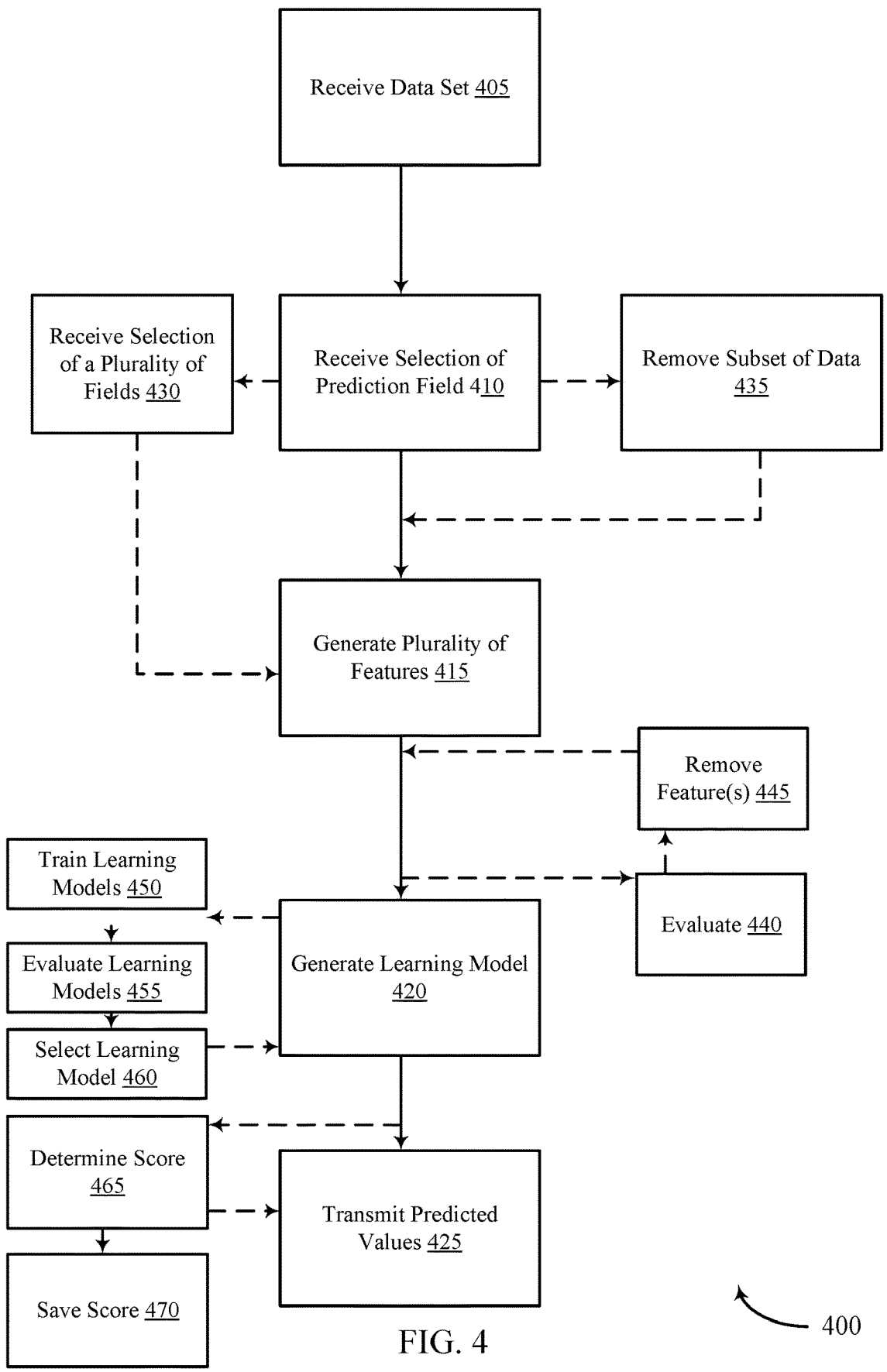
FIG. 4 illustrates an example of a process flow diagram performed by a database system that supports automatic machine learning model generation in accordance with aspects of the present disclosure.

FIG. 4 illustrates an example of a process flow 400 for generating a predictive machine learning model in accordance with various aspects of the present disclosure. As described with reference to FIG. 2, the steps of process flow 400 may be performed by a database server or components of the database server, such as a predictive model platform. The process flow 400 may include receiving a data set 405, receiving a selection of a prediction field 410, generating a plurality of features 415, generating a learning model 420, and transmitting predicted values 425. In some examples, process flow 400 may also include receiving a selection of a plurality of fields 430, removing a subset of data 435, evaluation 440, removing one or more features 445, training learning models 450, evaluating learning models 455, selecting learning models 460, determining scores 465, and saving the determined scores 470.

As described above with reference to FIG. 2, a database server (e.g., database server 210) may receive a selection of a data set 405. In some examples, the data set may be organized as an object, and may include an indication of one or more fields. Subsequently, for example, the database server may receive a selection of a prediction field 410 from the plurality of fields. The selection of a prediction field 410 may be, for example, based on the selected data set. The prediction field 410 may refer to the field in the data set for which the user is building the predictive model.

In some examples, the database server may receive a selection of fields 430 that the user selects to be included in the model building process. The user may select all available fields for the object or may select a subset of the available fields. For example, if the user wishes to not include certain data from the prediction (e.g., not include gender data in the prediction of a credit score), the user may select just a subset of the plurality of fields 430. However, as described with reference to FIG. 2, even if the user selects fields that eventually turn out to be causing inaccuracies in the predictive model, the database system may determine to not use those fields in the process of building the model.

In other examples, after receiving one or a plurality of fields 430, the database server may balance the training data by removing a subset of the data 435 or by adjusting a sampling rate of the data. In some examples, this step may be performed after the feature generation and removal steps discussed below. In other examples, this step may be performed before generating a plurality of features 415, as currently depicted in FIG. 4. As discussed above, the data within certain fields (e.g., prediction fields) may cause an overrepresentation in the predictive nature of the model. As such, the data may be over-sampled or under-sampled with respect to other portions of the data to yield a more balanced ratio of positive and negative examples. This process may be referred to as balancing the data. In general, balancing the data may include adjusting a sampling rate of certain features or sets of data.

Upon receiving the selection of the prediction field 410, the database server may generate a plurality of features 415, such as a plurality of relationships, functions, groupings or other associations that can be formed based on the data set. Such a procedure may be referred to as feature selection and engineering. The generation of the plurality of features 415 may be an example of generating a plurality of features from the data set. Thus, for example, the database server may generate the plurality of features automatically based in part on metadata associated with the data set. For example, the database server may recognize that a field of string data is associated with email addresses, and generate one or more features associated with the email addresses. Furthermore, because the metadata is available to the database server, a richer feature set may be generated than if only the raw data were provided. For example, the database server may be able to determine if the email addresses are valid or if the name in the email addresses match a name in some other field of the data set.

In some examples, the database server may evaluate the plurality of generated features and may remove some features from inclusion in the predicted model. Such a process may be referred to as sanity checking the feature generation. In some examples, the database server may evaluate a correlation 440 (or some other statistical relationship) between the plurality of predicted values (e.g., the prediction(s)) for the prediction field and a subset of the plurality of features. Upon conducting the evaluation 440, the database server may remove at least one feature 445 of the subset of the plurality of features from the predictive machine learning model if the correlation exceeds a threshold. The threshold may be an indication of the accuracy of the feature (or how the feature impacts the accuracy of the model) or the threshold may be indicative of how predictive the feature for the prediction field (e.g., if the feature is too predictive, the feature may bias the model towards the one feature). Upon determining that the threshold has been exceeded, one or more features may be removed and the learning model may be re-generated to determine a plurality of predicted values. This process may repeat until the threshold is not exceeded, which may ultimately result in more-accurate predicted values.

In some examples, the database server may then generate a predictive learning model 420 based in part on the plurality of features. The predictive learning model may utilize the received data set 405, the received selection of the prediction field 410, and the plurality of features 415 to generate the model 420. In some instances, upon generating the learning model 420, a plurality of candidate machine learning models may be trained 450. The plurality of candidate machine learning models 450 may be trained, for example, based on one or more of the data set or the prediction field received by the database server. Upon training the candidate machine models 450, the models may be evaluated based in part on a predictive accuracy of each of the plurality of models 455. Stated alternatively, the models may be evaluated to determine a threshold level of accuracy given the input received by the database server. Accordingly, for example, a predictive learning machine model may be selected 460 based in part on the evaluating. Thus, in some examples, the predictive machine learning model that would result in a most-accurate prediction given the input received by the database server may be selected.

Upon generating the predictive learning model 420, the database server may perform the predictions and transmit the predicted 425 values to, for example, a computing device. This may be an example of transmitting an indication of a plurality of predicted values for the prediction field based in part on the predictive machine learning model. In some examples, a score may be determined for the prediction field 465. This score may be based in part on generating the predictive learning model 420. Thus, in some examples, the transmission of the predicted values 425 may be based on the score. The determined score may be based on a number of characteristics. For example, the score may be based on a number of predicted values or a correlation between a particular predicted value and the data set (e.g., the accuracy of the prediction). In some examples, the score may be saved 470 to the database server, which may be used in determining future predictions using a same or similar data set, prediction field(s), or both.

Figure 5:
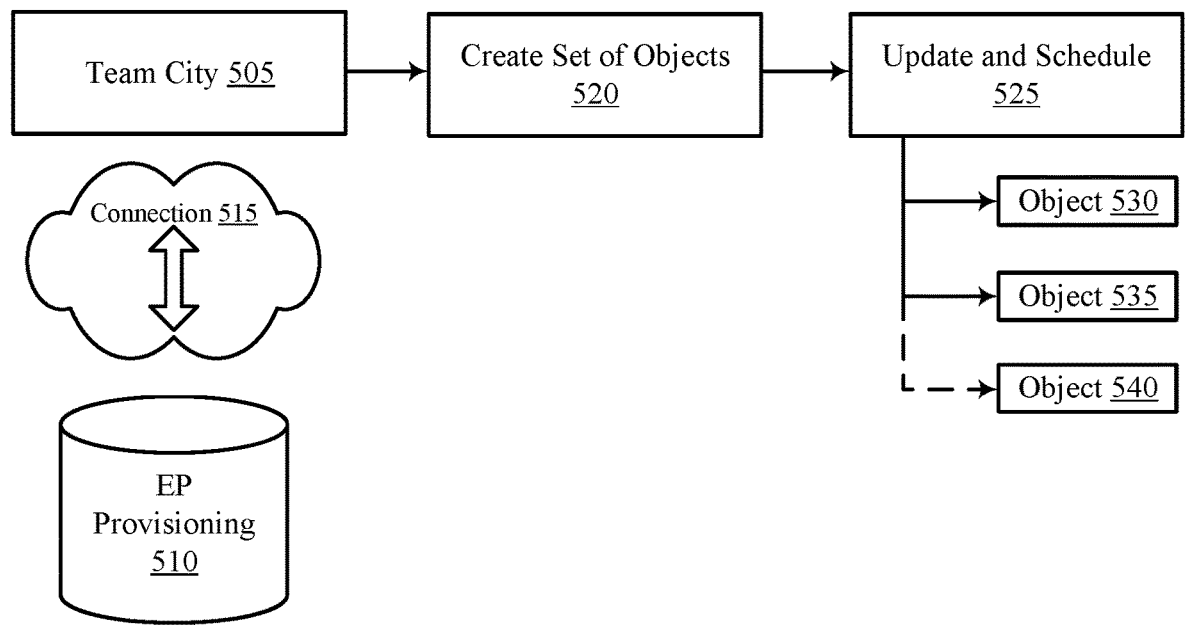
FIGS. 5-7 illustrate additional examples of database systems that support automatic machine learning model generation in accordance with aspects of the present disclosure.

FIG. 5 illustrates an example of a system 500 that supports generating a predictive machine learning model in accordance with various aspects of the present disclosure. The system 500 may include Team City 505, which may be an example of a continuous integration server; EP Provisioning 510, which may be an example of a server or, more specifically, a business process outsourcing (BPO) server; creation component 520, which may create a set of objects to utilize in generating a predictive machine learning model; updating and scheduling component 525, which may schedule and update system workflows; and objects 530, 535, and 540, which may be or may represent specific data or data sets.

In some examples, EP Provisioning database 510 may obtain a list of predictive models to be generated. The EP Provisioning database 510 may also obtain requisite data to generate one or more predictive models.

In some examples, Team City 505 may run hourly to pull BPO configurations for all Builder tenants (e.g., of a multi-tenant database system) to get current and disabled configurations. In some examples, a whitelist is constructed and stored in the EP Provisioning database 510. In other examples, Team City 505 may run at a pre-defined time interval or at random time intervals to obtain configurations for one or more tenants. In some examples, the configurations may be associated with one or more specific tenants. In other examples the whitelist created based on the configurations may be stored in the EP Provisioning database 510. In other examples, the data puller job is executed hourly on all prediction objects to get all incremental changes to them since the last successful pull. In some examples, Team City 505 may be in communication with EP Provisioning database 510 via connection 515. In some examples, Team City 505 may receive data from EP Provisioning database 510 more or less frequently in order to record incremental changes to the database.

Additionally or alternatively, for example a daily snapshotting job may be executed for all prediction objects. For example, Team City 505 may monitor EP Provisioning database 510 at certain time intervals to ensure that any changes, no matter how incremental, are recorded. Team City 505 may not be limited to a daily snapshotting job. In other examples, Team City 505 may create and organize any number of jobs. For example, Team City 505 may determine and schedule one or more mathematical calculations to be performed on the data used to generate a predictive model. Team City 505 may then monitor the jobs (e.g., calculations) and schedule subsequent jobs accordingly.

In other examples, even if a same prediction object is referenced multiple times across different configurations, only a single set of data flows is set up. Additionally or alternatively, for example, even if a same prediction object is reference multiple times across different configurations, any number of data flows may be set up. The data flows may, for example, correspond to one or more prediction objects. In other examples, any one of creation component 520, scheduling component 525, and objects 530, 535, and 540 may be utilized to generate a predictive machine learning model as described above with reference to FIGS. 1 through 4.

Figure 6:
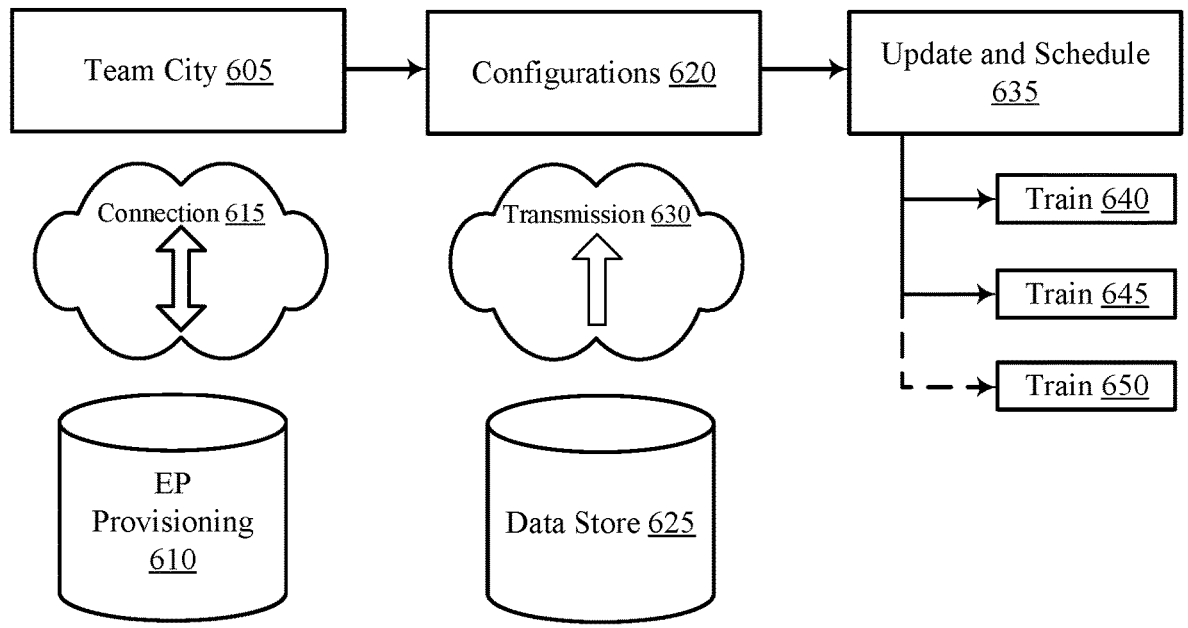

FIG. 6 illustrates an example of a system 600 that supports generating a predictive machine learning model in accordance with various aspects of the present disclosure. The system 600 may include Team City 605, which may be an example of Team City as described with reference to FIG. 5; EP Provisioning 610, which may be an example of EP Provisioning 510 as described with reference to FIG. 5; configuration component 620, which may create scoring workflows for configurations; data store 625, which may be an example of database server 210 as described with reference to FIG. 2; updating and scheduling component 525, which may be an example of updating and scheduling component 525 as described with reference to FIG. 5; and training models 640, 645, and 650. In some examples, Team City 605 may be in communication with EP Provisioning database via connection 615 and data store 625 may transmit data or communications to configuration component 620 via transmission 630.

In some examples, FIG. 6 may illustrate model training flows for new configurations in the EP Provisioning database 610. In other examples, FIG. 6 may illustrate the monthly model retrain process for all configurations. In other examples, FIG. 6 may illustrate that all model training runs operate off of the latest snapshot of the prediction object. In other examples, any one of Team City 605, EP Provisioning database 610, configurations component 620, data store 625, updating and scheduling component 635, and training models 640, 645, and 650 may be utilized to generate a predictive machine learning model as described above with reference to FIGS. 1 through 5.

Figure 7:
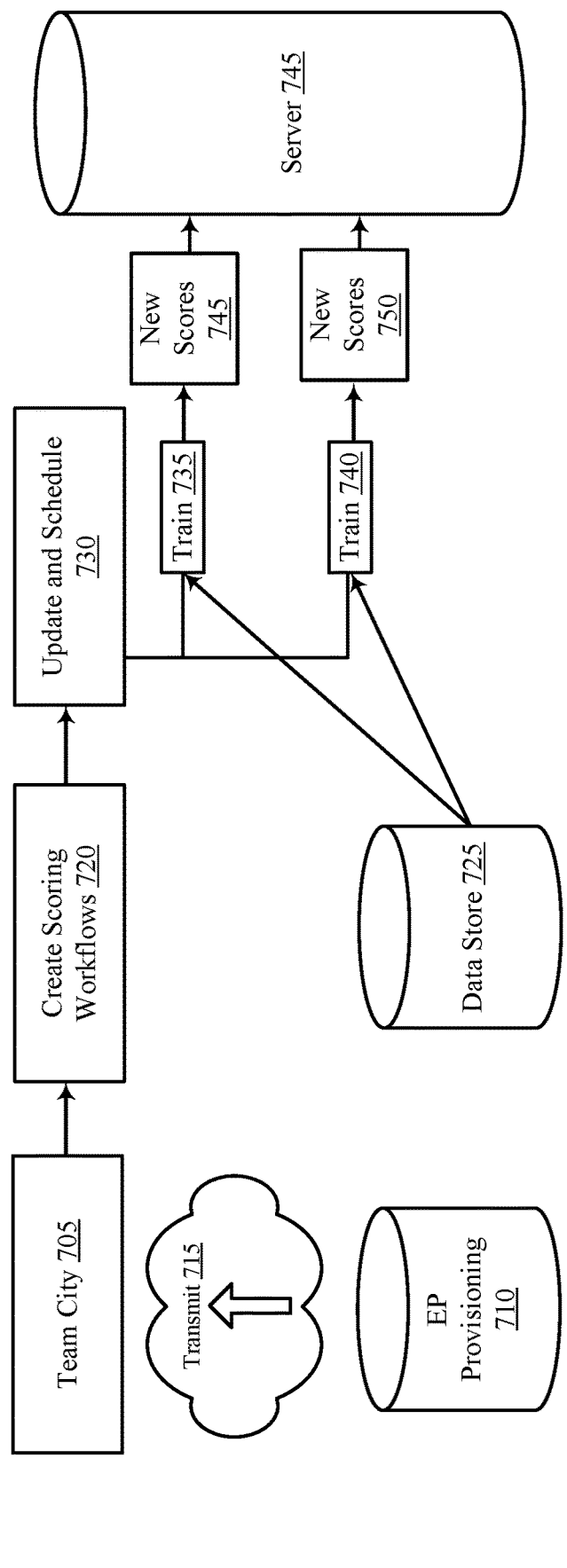

FIG. 7 illustrates an example of a system 700 that supports generating a predictive machine learning model in accordance with various aspects of the present disclosure. The system 700 may include Team City 705, which may be an example of Team City as described with reference to FIG. 5; EP Provisioning 710, which may be an example of EP Provisioning 510 as described with reference to FIG. 5; scoring creation and workflow component 720; data store 725, which may be an example of the data store 625 as described with reference to FIG. 6; updating and scheduling component 730, which may be an example of updating and scheduling component 525 as described with reference to FIG. 5; training models 735 and 740, which may be an example of one or more of training models 640, 645, and 650 as described with reference to FIG. 6; new score components 745 and 750; and server 745, which may be an example of database server 210 or database 215 as described with reference to FIG. 2. In some examples, Team City 605 may be in communication with EP Provisioning database via connection 715 and data store 625 may transmit data or communications to training models 735 and 740.

In some examples, FIG. 7 may illustrate scoring and data pushback flows. For example, scoring jobs may run on an hourly cadence scoring all increments pulled since the last dataset that was successfully scored. In other examples, scoring jobs may run periodically, randomly, or on a predetermined time frame to score any increments pulled since the dataset was last successfully scored. In other examples, data pushback jobs are chained off of scoring jobs and push back the last two scored datasets, in order, for redundancy in case data pushback failed the previous time. In other examples, data pushback jobs may be chained off of scoring jobs and may push back any number of scored datasets, in any order. In some examples, the data pushback jobs may be based on previously-successful data pushback. In other examples, any one of Team City 705, EP Provisioning database 710, scoring creation and workflow component 720, data store 725, updating and scheduling component 730, training models 735 and 740, new score components 745 and 750, and server 745 may be utilized to generate a predictive machine learning model as described above with reference to FIGS. 1 through 6.

Figure 8:
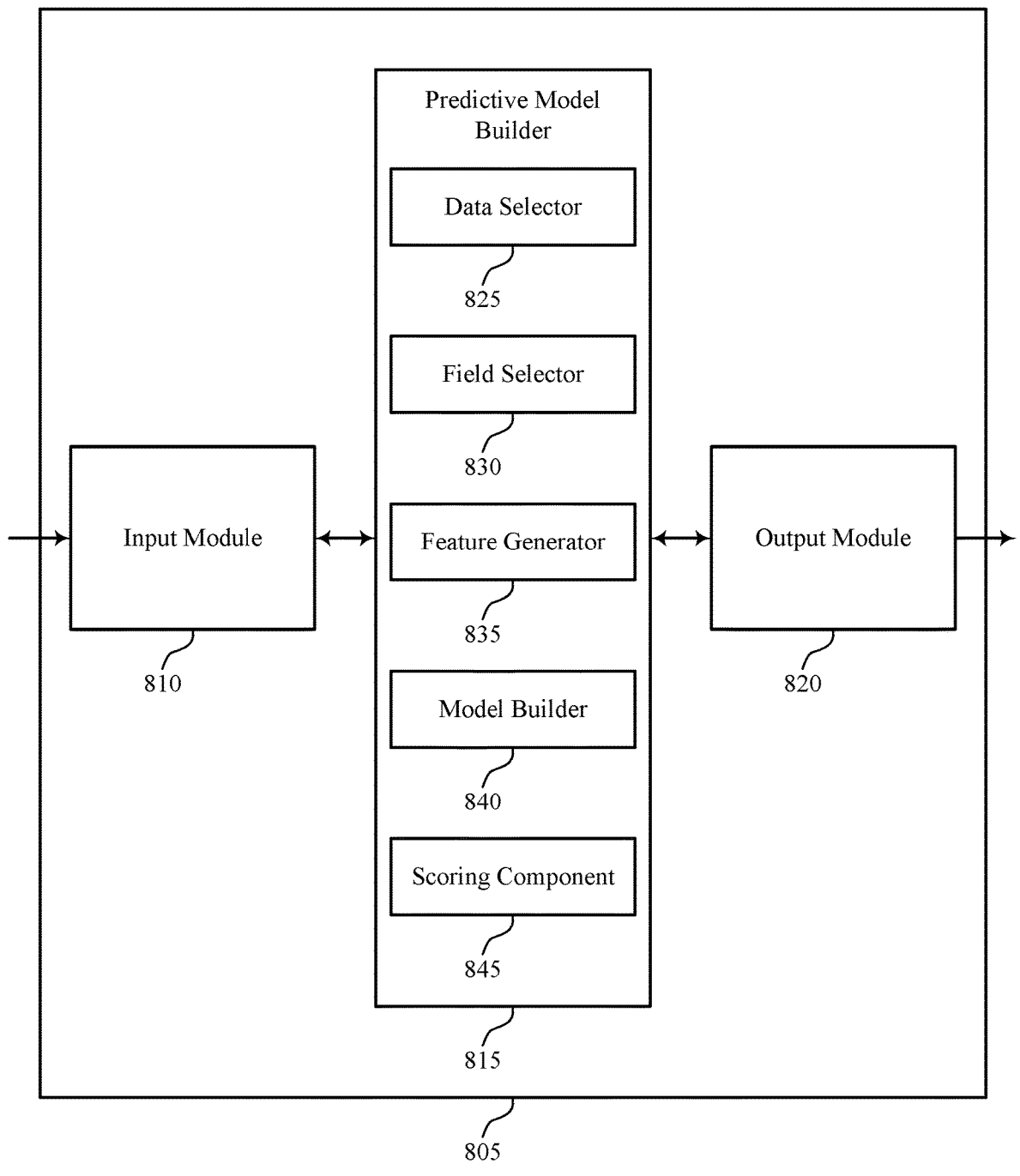
FIGS. 8 through 9 show block diagrams of a device that supports automatic machine learning model generation in accordance with aspects of the present disclosure.

FIG. 8 shows a block diagram 800 of an apparatus 805 that supports automatic machine learning model generation in accordance with aspects of the present disclosure. Apparatus 805 may include input module 810, predictive model builder 815, and output module 820. Apparatus 805 may also include a processor. Each of these components may be in communication with one another (e.g., via one or more buses). In some cases, apparatus 805 may be an example of a user terminal, a database server, or a system containing multiple computing devices.

Predictive model builder 815 may be an example of aspects of the predictive model builder 1015 described with reference to FIG. 10.

Predictive model builder 815 and/or at least some of its various sub-components may be implemented in hardware, software executed by a processor, firmware, or any combination thereof. If implemented in software executed by a processor, the functions of the predictive model builder 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The predictive model builder 815 and/or at least some of its various sub-components may be physically located at various positions, including being distributed such that portions of functions are implemented at different physical locations by one or more physical devices. In some examples, predictive model builder 815 and/or at least some of its various sub-components may be a separate and distinct component in accordance with various aspects of the present disclosure. In other examples, predictive model builder 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Predictive model builder 815 may also include data selector 825, field selector 830, feature generator 835, model builder 840, and scoring component 845.

Data selector 825 may receive, at a database server, a selection of a data set, where the data set includes a set of fields and receive an indication of one or more additional objects, where the indication of the set of predicted values is based on receiving the indication of the one or more additional objects. In some cases, the receiving the selection of the data set includes receiving an indication of an object, where the indication of the set of predicted values is based on receiving the indication of the object. In some cases, the database server includes a multi-tenant database server.

Field selector 830 may receive, at the database server, a selection of a prediction field from the set of fields and receive a selection of prediction fields from the set of fields, where the set of features from the data set are generated based on the selection of prediction fields.

Feature generator 835 may generate, by the database server, a set of features from the data set, where the set of features are generated automatically based on metadata associated with the data set. In some cases, the metadata associated with the data set includes a classification of a field and a data type of the field.

Model builder 840 may generate, by the database server, the predictive machine learning model based on the set of features.

Scoring component 845 may determine a score for the prediction field based on generating the predictive machine learning model, where transmitting the indication of the set of predicted values is based on the determined score, transmit an indication of a set of predicted values for the prediction field based on the predictive machine learning model, receive a new record associated with the data set, update the score for the prediction field based on the new record, and store the score in the database server.

Figure 9:
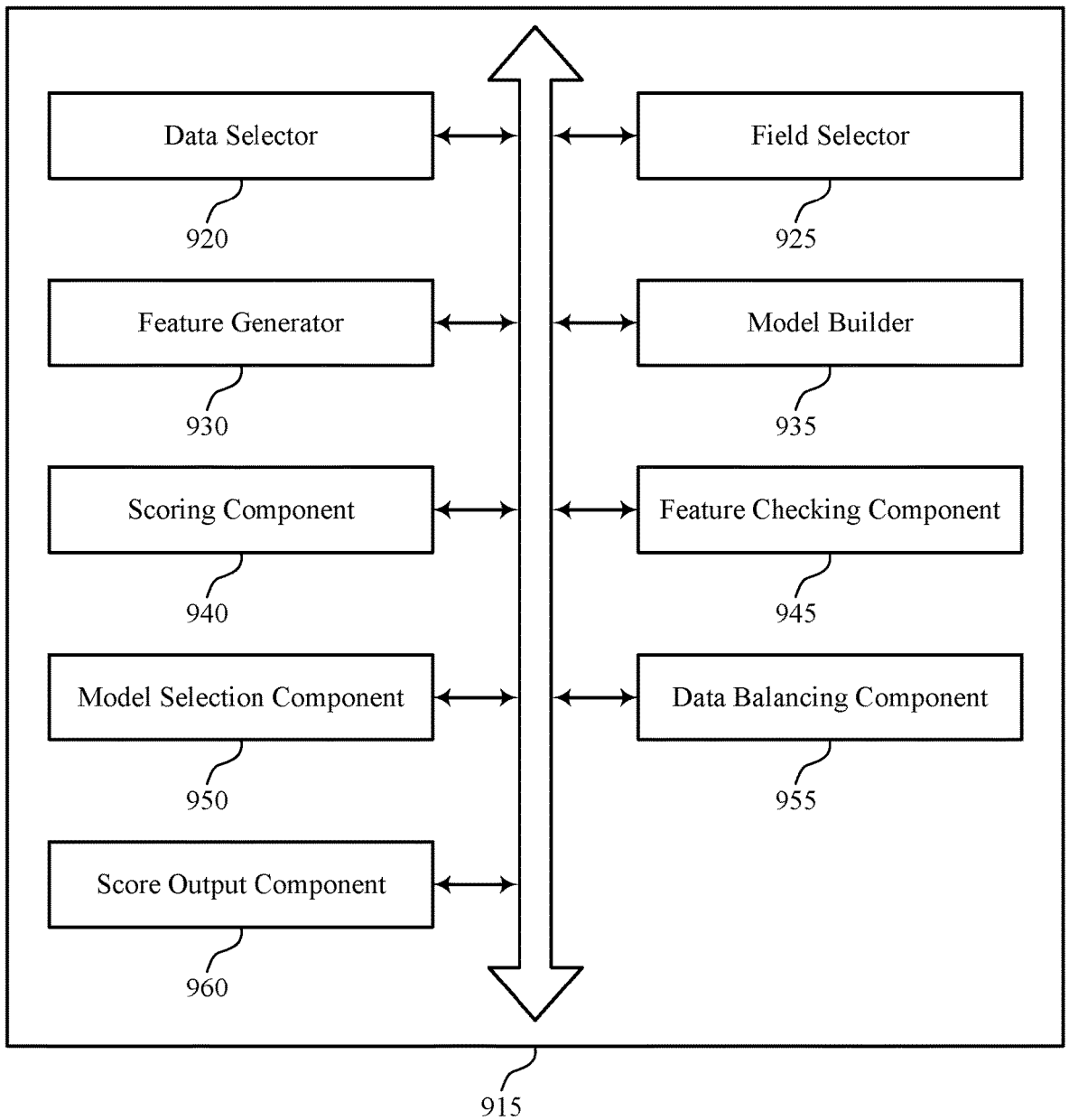

FIG. 9 shows a block diagram 900 of a predictive model builder 915 that supports automatic machine learning model generation in accordance with aspects of the present disclosure. The predictive model builder 915 may be an example of aspects of a predictive model builder 1015 described with reference to FIGS. 7, 8, and 10. The predictive model builder 915 may include data selector 920, field selector 925, feature generator 930, model builder 935, scoring component 940, feature checking component 945, model selection component 950, data balancing component 955, and score output component 960. Each of these modules may communicate, directly or indirectly, with one another (e.g., via one or more buses).

Data selector 920 may receive, at a database server, a selection of a data set, where the data set includes a set of fields and receive an indication of one or more additional objects, where the indication of the set of predicted values is based on receiving the indication of the one or more additional objects. In some cases, the receiving the selection of the data set includes receiving an indication of an object, where the indication of the set of predicted values is based on receiving the indication of the object. In some cases, the database server includes a multi-tenant database server.

Field selector 925 may receive, at the database server, a selection of a prediction field from the set of fields and receive a selection of prediction fields from the set of fields, where the set of features from the data set are generated based on the selection of prediction fields.

Feature generator 930 may generate, by the database server, a set of features from the data set, where the set of features are generated automatically based on metadata associated with the data set. In some cases, the metadata associated with the data set includes a classification of a field and a data type of the field.

Model builder 935 may generate, by the database server, the predictive machine learning model based on the set of features.

Scoring component 940 may determine a score for the prediction field based on generating the predictive machine learning model, where transmitting the indication of the set of predicted values is based on the determined score, transmit an indication of a set of predicted values for the prediction field based on the predictive machine learning model, receive a new record associated with the data set, update the score for the prediction field based on the new record, and store the score in the database server.

Feature checking component 945 may evaluate a statistical relationship between the set of predicted values for the prediction field and a subset of the set of features and remove at least one feature of the subset of the set of features from the predictive machine learning model if the statistical relationship exceeds a threshold. In some cases, the statistical relationship includes a correlation calculation, a Cramer's V calculation, or a combination thereof.

Model selection component 950 may train a set of candidate machine learning models, evaluate the set of candidate machine learning models based on a predictive accuracy of each of the set of candidate machine learning models, and select the predictive machine learning model based on the evaluating.

Data balancing component 955 may adjust a sampling rate of the data set based on a representation rate of the set of predicted values.

Score output component 960 may save the set of predicted values to the prediction field based on transmitting the indication of the set of predicted values.

Figure 10:
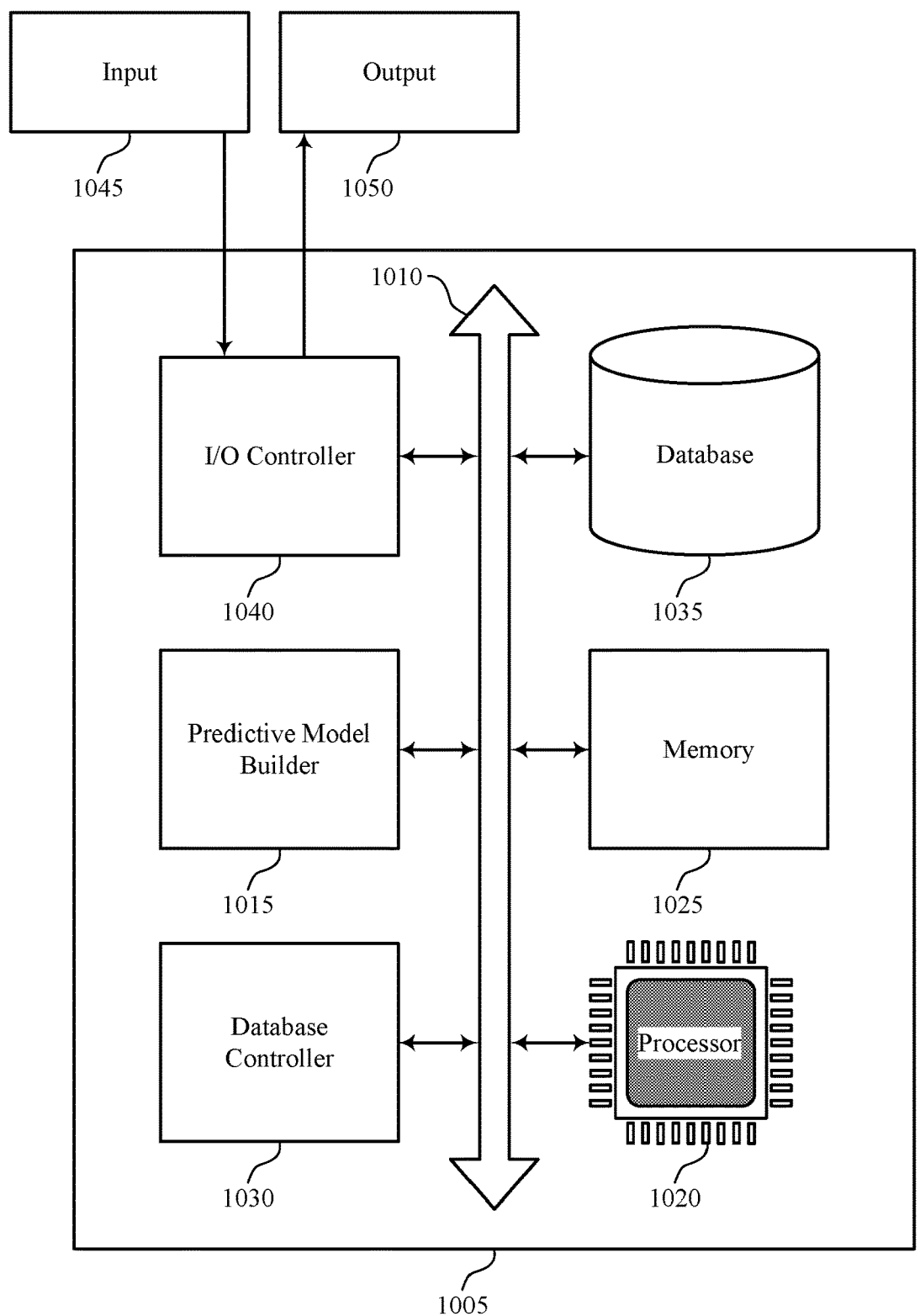
FIG. 10 illustrates a block diagram of a system including a database server that supports automatic machine learning model generation in accordance with aspects of the present disclosure.

FIG. 10 shows a diagram of a system 1000 including a device 1005 that supports automatic machine learning model generation in accordance with aspects of the present disclosure. Device 1005 may be an example of or include the components of data center 120 or database server 210 as described above, e.g., with reference to FIG. 1. Device 1005 may include components for bi-directional data communications including components for transmitting and receiving communications, including predictive model builder 1015, processor 1020, memory 1025, database controller 1030, database 1035, and I/O controller 1040. These components may be in electronic communication via one or more buses (e.g., bus 1010).

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting automatic machine learning model generation).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Database controller 1030 may manage data storage and processing in database 1035. In some cases, a user may interact with database controller 1030. In other cases, database controller 1030 may operate automatically without user interaction.

Database 1035 may be an example of a single database, a distributed database, multiple distributed databases, or an emergency backup database.

I/O controller 1040 may manage input and output signals for device 1005. I/O controller 1040 may also manage peripherals not integrated into device 1005. In some cases, I/O controller 1040 may represent a physical connection or port to an external peripheral. In some cases, I/O controller 1040 may utilize an operating system such as iOS®, ANDROID®, MS-DOS®, MS-WINDOWS®, OS/2®, UNIX®, LINUX®, or another known operating system. In other cases, I/O controller 1040 may represent or interact with a modem, a keyboard, a mouse, a touchscreen, or a similar device. In some cases, I/O controller 1040 may be implemented as part of a processor. In some cases, a user may interact with device 1005 via I/O controller 1040 or via hardware components controlled by I/O controller 1040.

Figure 11:
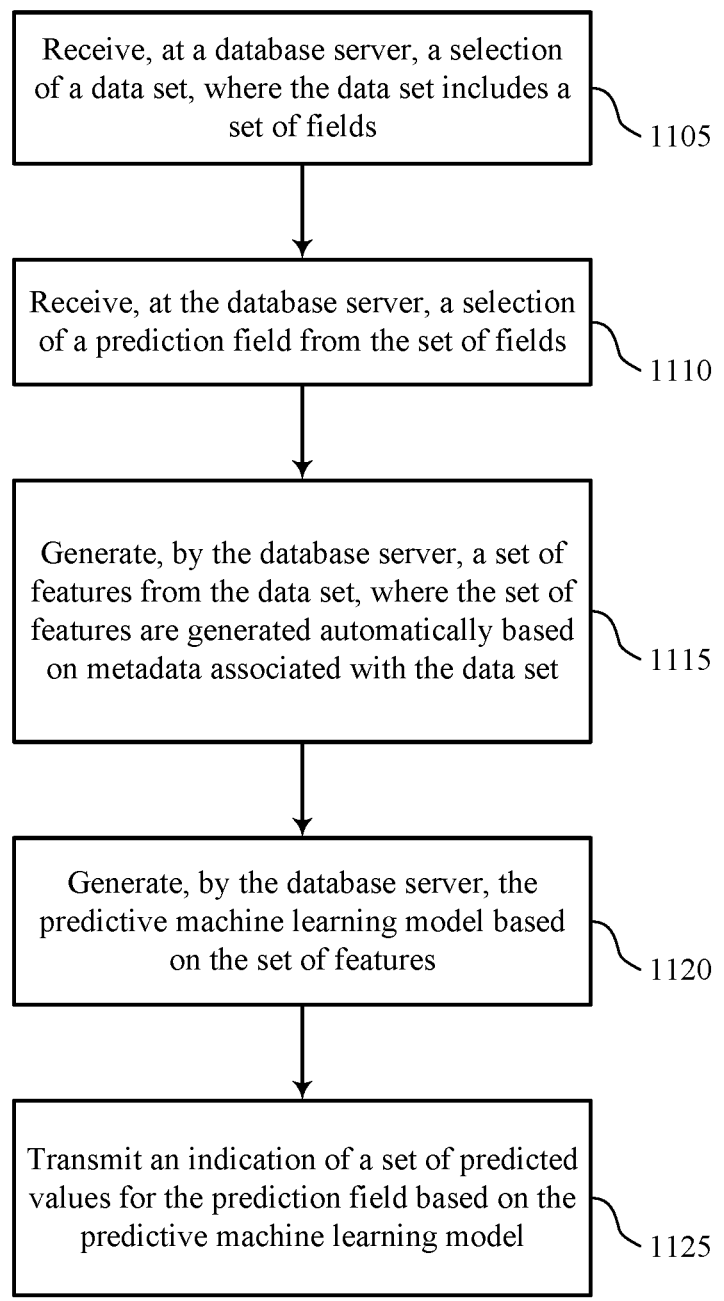
FIGS. 11 through 15 illustrate methods for automatic machine learning model generation in accordance with aspects of the present disclosure.

FIG. 11 shows a flowchart illustrating a method 1100 for automatic machine learning model generation in accordance with aspects of the present disclosure. The operations of method 1100 may be implemented by a data center 120 or database server 210 or its components as described herein. For example, the operations of method 1100 may be performed by a predictive model builder as described with reference to FIGS. 8 through 10. In some examples, a data center 120 or database server 210 may execute a set of codes to control the functional elements of the device to perform the functions described below. Additionally or alternatively, the data center 120 or database server 210 may perform aspects of the functions described below using special-purpose hardware.

At 1105 the data center 120 or database server 210 may receive, at a database server, a selection of a data set, wherein the data set comprises a plurality of fields. The operations of 1105 may be performed according to the methods described herein. In certain examples, aspects of the operations of 1105 may be performed by a data selector as described with reference to FIGS. 8 through 10.

At 1110 the data center 120 or database server 210 may receive, at the database server, a selection of a prediction field from the plurality of fields. The operations of 1110 may be performed according to the methods described herein. In certain examples, aspects of the operations of 1110 may be performed by a field selector as described with reference to FIGS. 8 through 10.

At 1115 the data center 120 or database server 210 may generate, by the database server, a plurality of features from the data set, wherein the plurality of features are generated automatically based at least in part on metadata associated with the data set. The operations of 1115 may be performed according to the methods described herein. In certain examples, aspects of the operations of 1115 may be performed by a feature generator as described with reference to FIGS. 8 through 10.

At 1120 the data center 120 or database server 210 may generate, by the database server, the predictive machine learning model based at least in part on the plurality of features. The operations of 1120 may be performed according to the methods described herein. In certain examples, aspects of the operations of 1120 may be performed by a model builder as described with reference to FIGS. 8 through 10.

At 1125 the data center 120 or database server 210 may transmit an indication of a plurality of predicted values for the prediction field based at least in part on the predictive machine learning model. The operations of 1125 may be performed according to the methods described herein. In certain examples, aspects of the operations of 1125 may be performed by a scoring component as described with reference to FIGS. 8 through 10.

Figure 12:
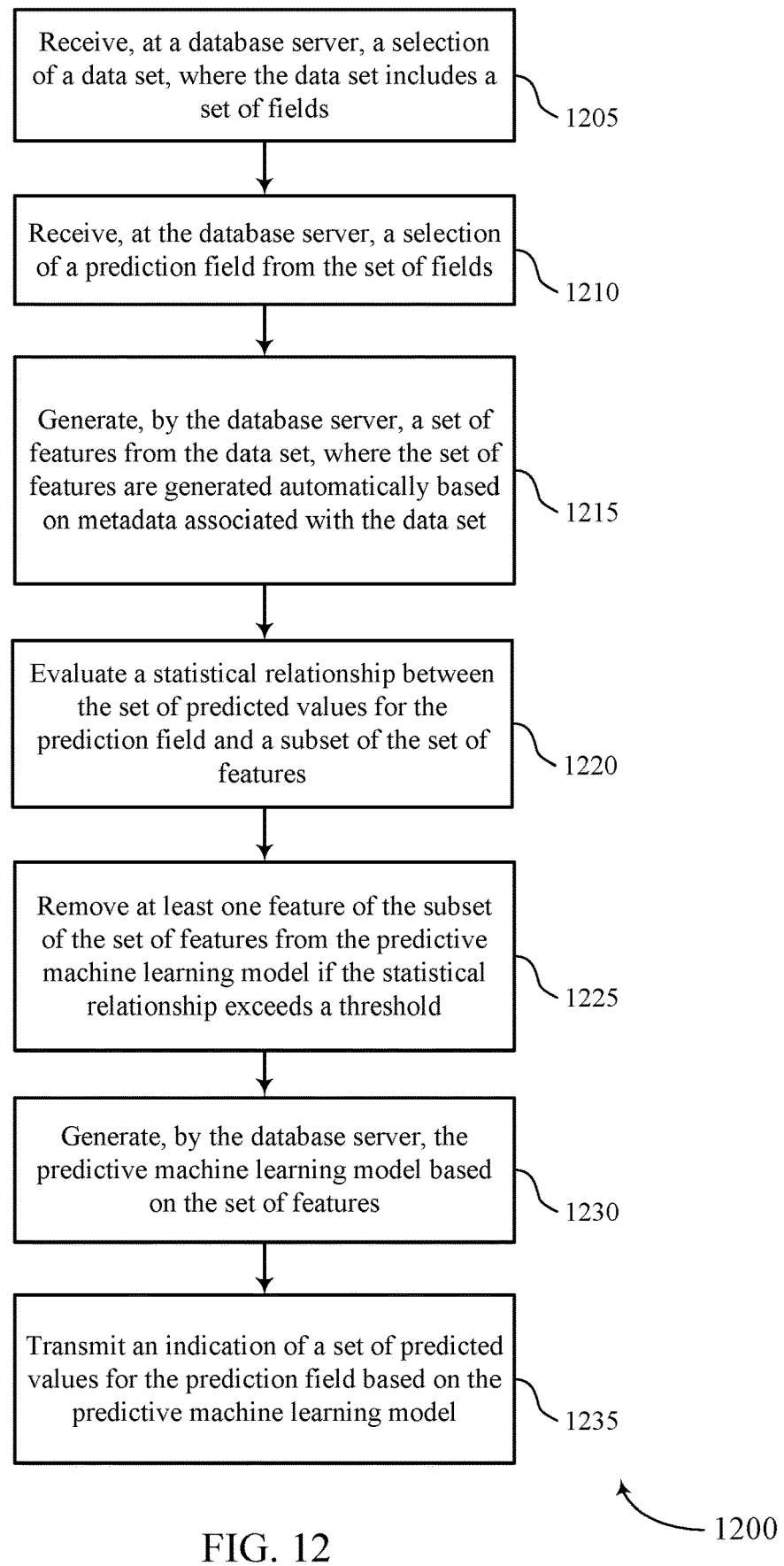

FIG. 12 shows a flowchart illustrating a method 1200 for automatic machine learning model generation in accordance with aspects of the present disclosure. The operations of method 1200 may be implemented by a data center 120 or database server 210 or its components as described herein. For example, the operations of method 1200 may be performed by a predictive model builder as described with reference to FIGS. 8 through 10. In some examples, a data center 120 or database server 210 may execute a set of codes to control the functional elements of the device to perform the functions described below. Additionally or alternatively, the data center 120 or database server 210 may perform aspects of the functions described below using special-purpose hardware.

At 1205 the data center 120 or database server 210 may receive, at a database server, a selection of a data set, wherein the data set comprises a plurality of fields. The operations of 1205 may be performed according to the methods described herein. In certain examples, aspects of the operations of 1205 may be performed by a data selector as described with reference to FIGS. 8 through 10.

At 1210 the data center 120 or database server 210 may receive, at the database server, a selection of a prediction field from the plurality of fields. The operations of 1210 may be performed according to the methods described herein. In certain examples, aspects of the operations of 1210 may be performed by a field selector as described with reference to FIGS. 8 through 10.

At 1215 the data center 120 or database server 210 may generate, by the database server, a plurality of features from the data set, wherein the plurality of features are generated automatically based at least in part on metadata associated with the data set. The operations of 1215 may be performed according to the methods described herein. In certain examples, aspects of the operations of 1215 may be performed by a feature generator as described with reference to FIGS. 8 through 10.

At 1220 the data center 120 or database server 210 may evaluate a statistical relationship between the plurality of predicted values for the prediction field and a subset of the plurality of features. The operations of 1220 may be performed according to the methods described herein. In certain examples, aspects of the operations of 1220 may be performed by a feature checking component as described with reference to FIGS. 8 through 10.

At 1225 the data center 120 or database server 210 may remove at least one feature of the subset of the plurality of features from the predictive machine learning model if the statistical relationship exceeds a threshold. The operations of 1225 may be performed according to the methods described herein. In certain examples, aspects of the operations of 1225 may be performed by a feature checking component as described with reference to FIGS. 8 through 10.

At 1230 the data center 120 or database server 210 may generate, by the database server, the predictive machine learning model based at least in part on the plurality of features. The operations of 1230 may be performed according to the methods described herein. In certain examples, aspects of the operations of 1230 may be performed by a model builder as described with reference to FIGS. 8 through 10.

At 1235 the data center 120 or database server 210 may transmit an indication of a plurality of predicted values for the prediction field based at least in part on the predictive machine learning model. The operations of 1235 may be performed according to the methods described herein. In certain examples, aspects of the operations of 1235 may be performed by a scoring component as described with reference to FIGS. 8 through 10.

Figure 13:
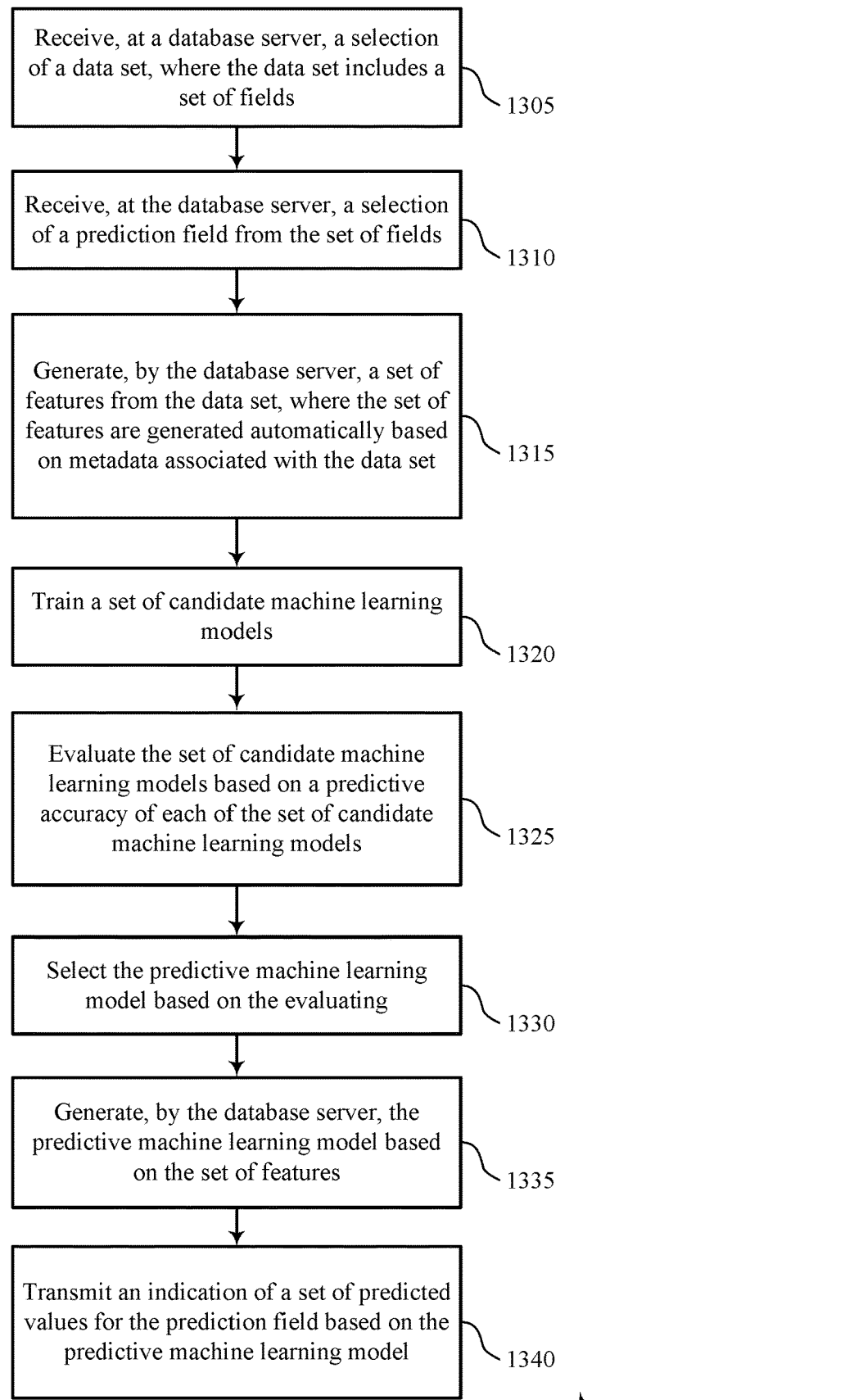

FIG. 13 shows a flowchart illustrating a method 1300 for automatic machine learning model generation in accordance with aspects of the present disclosure. The operations of method 1300 may be implemented by a data center 120 or database server 210 or its components as described herein. For example, the operations of method 1300 may be performed by a predictive model builder as described with reference to FIGS. 8 through 10. In some examples, a data center 120 or database server 210 may execute a set of codes to control the functional elements of the device to perform the functions described below. Additionally or alternatively, the data center 120 or database server 210 may perform aspects of the functions described below using special-purpose hardware.

At 1305 the data center 120 or database server 210 may receive, at a database server, a selection of a data set, wherein the data set comprises a plurality of fields. The operations of 1305 may be performed according to the methods described herein. In certain examples, aspects of the operations of 1305 may be performed by a data selector as described with reference to FIGS. 8 through 10.

At 1310 the data center 120 or database server 210 may receive, at the database server, a selection of a prediction field from the plurality of fields. The operations of 1310 may be performed according to the methods described herein. In certain examples, aspects of the operations of 1310 may be performed by a field selector as described with reference to FIGS. 8 through 10.

At 1315 the data center 120 or database server 210 may generate, by the database server, a plurality of features from the data set, wherein the plurality of features are generated automatically based at least in part on metadata associated with the data set. The operations of 1315 may be performed according to the methods described herein. In certain examples, aspects of the operations of 1315 may be performed by a feature generator as described with reference to FIGS. 8 through 10.

At 1320 the data center 120 or database server 210 may train a plurality of candidate machine learning models. The operations of 1320 may be performed according to the methods described herein. In certain examples, aspects of the operations of 1320 may be performed by a model selection component as described with reference to FIGS. 8 through 10.

At 1325 the data center 120 or database server 210 may evaluate the plurality of candidate machine learning models based at least in part on a predictive accuracy of each of the plurality of candidate machine learning models. The operations of 1325 may be performed according to the methods described herein. In certain examples, aspects of the operations of 1325 may be performed by a model selection component as described with reference to FIGS. 8 through 10.

At 1330 the data center 120 or database server 210 may select the predictive machine learning model based at least in part on the evaluating. The operations of 1330 may be performed according to the methods described herein. In certain examples, aspects of the operations of 1330 may be performed by a model selection component as described with reference to FIGS. 8 through 10.

At 1335 the data center 120 or database server 210 may generate, by the database server, the predictive machine learning model based at least in part on the plurality of features. The operations of 1335 may be performed according to the methods described herein. In certain examples, aspects of the operations of 1335 may be performed by a model builder as described with reference to FIGS. 8 through 10.

At 1340 the data center 120 or database server 210 may transmit an indication of a plurality of predicted values for the prediction field based at least in part on the predictive machine learning model. The operations of 1340 may be performed according to the methods described herein. In certain examples, aspects of the operations of 1340 may be performed by a scoring component as described with reference to FIGS. 8 through 10.

Figure 14:
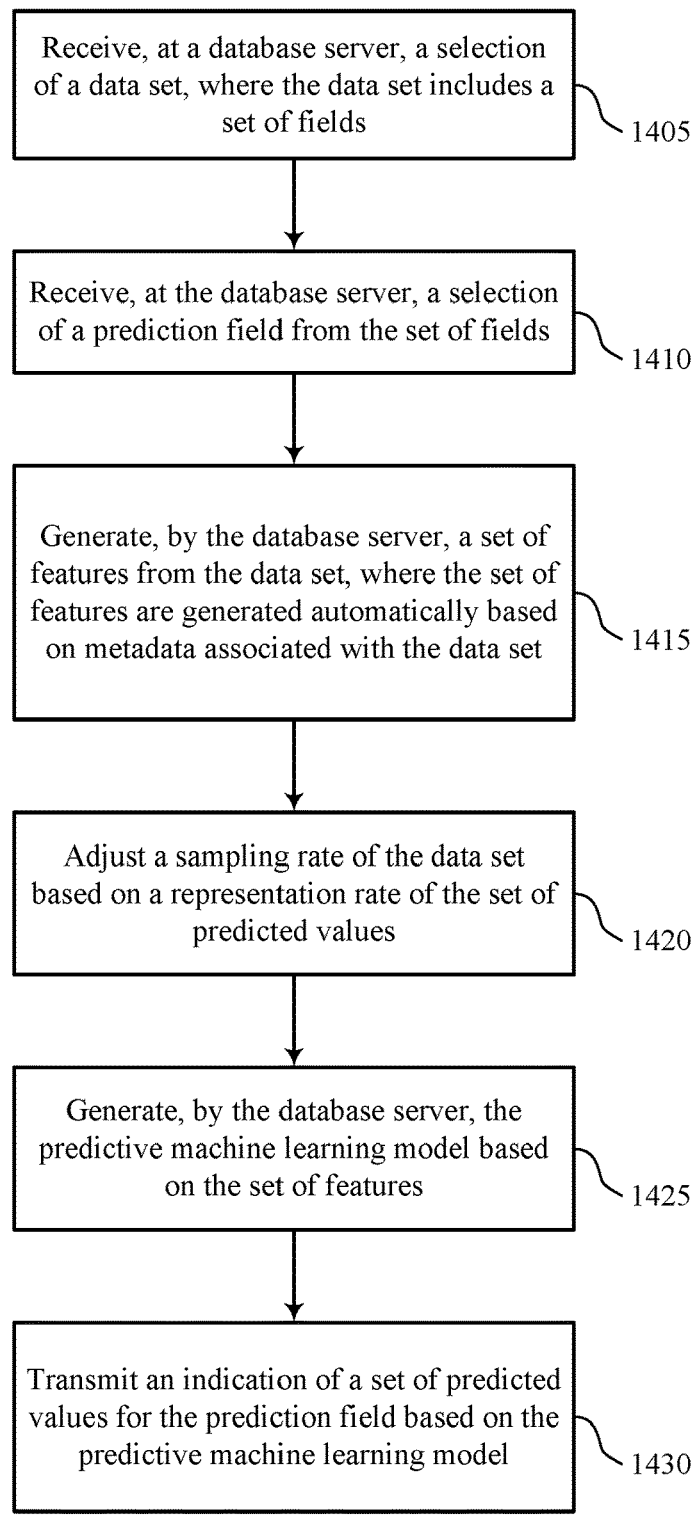

FIG. 14 shows a flowchart illustrating a method 1400 for automatic machine learning model generation in accordance with aspects of the present disclosure. The operations of method 1400 may be implemented by a data center 120 or database server 210 or its components as described herein. For example, the operations of method 1400 may be performed by a predictive model builder as described with reference to FIGS. 8 through 10. In some examples, a data center 120 or database server 210 may execute a set of codes to control the functional elements of the device to perform the functions described below. Additionally or alternatively, the data center 120 or database server 210 may perform aspects of the functions described below using special-purpose hardware.

At 1405 the data center 120 or database server 210 may receive, at a database server, a selection of a data set, wherein the data set comprises a plurality of fields. The operations of 1405 may be performed according to the methods described herein. In certain examples, aspects of the operations of 1405 may be performed by a data selector as described with reference to FIGS. 8 through 10.

At 1410 the data center 120 or database server 210 may receive, at the database server, a selection of a prediction field from the plurality of fields. The operations of 1410 may be performed according to the methods described herein. In certain examples, aspects of the operations of 1410 may be performed by a field selector as described with reference to FIGS. 8 through 10.

At 1415 the data center 120 or database server 210 may generate, by the database server, a plurality of features from the data set, wherein the plurality of features are generated automatically based at least in part on metadata associated with the data set. The operations of 1415 may be performed according to the methods described herein. In certain examples, aspects of the operations of 1415 may be performed by a feature generator as described with reference to FIGS. 8 through 10.

At 1420 the data center 120 or database server 210 may adjust a sampling rate of the data set based at least in part on a representation rate of the plurality of predicted values. The operations of 1420 may be performed according to the methods described herein. In certain examples, aspects of the operations of 1420 may be performed by a data balancing component as described with reference to FIGS. 8 through 10.

At 1425 the data center 120 or database server 210 may generate, by the database server, the predictive machine learning model based at least in part on the plurality of features. The operations of 1425 may be performed according to the methods described herein. In certain examples, aspects of the operations of 1425 may be performed by a model builder as described with reference to FIGS. 8 through 10.

At 1430 the data center 120 or database server 210 may transmit an indication of a plurality of predicted values for the prediction field based at least in part on the predictive machine learning model. The operations of 1430 may be performed according to the methods described herein. In certain examples, aspects of the operations of 1430 may be performed by a scoring component as described with reference to FIGS. 8 through 10.

Figure 15:
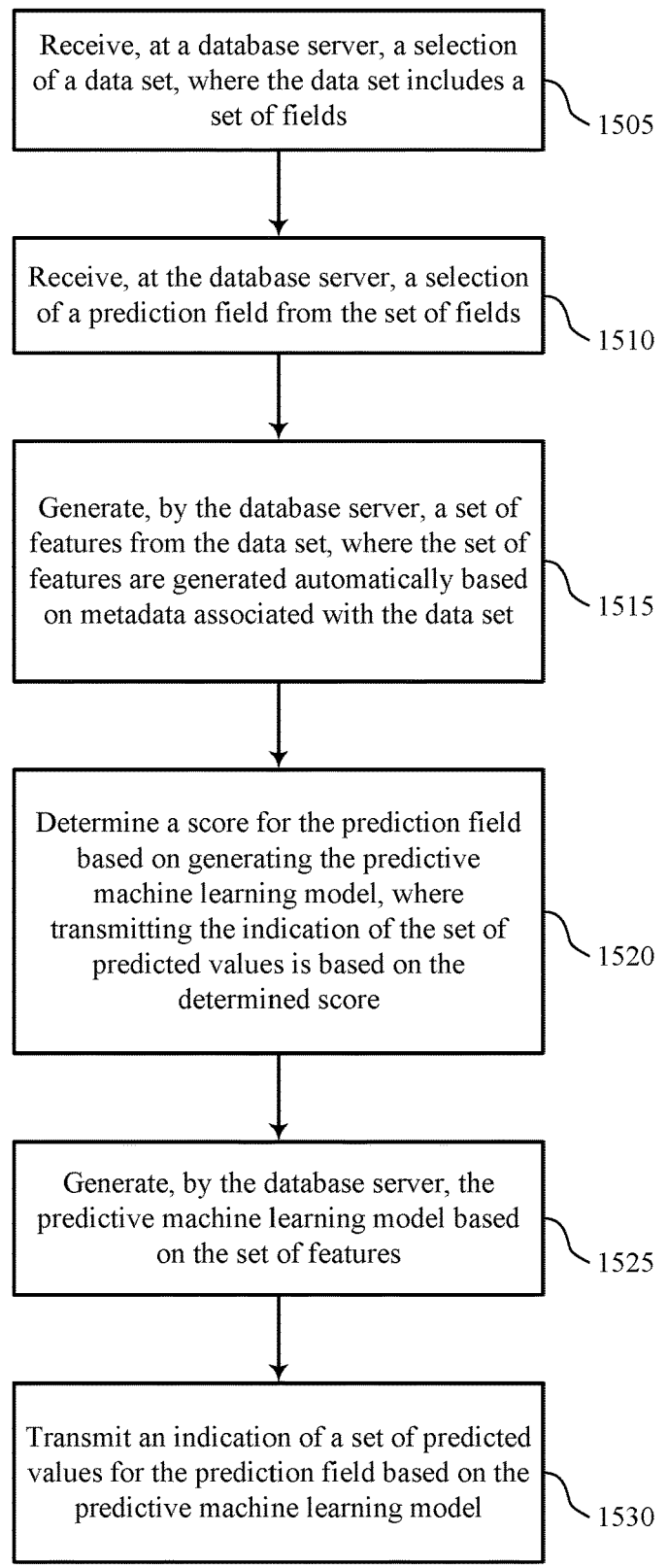

FIG. 15 shows a flowchart illustrating a method 1500 for automatic machine learning model generation in accordance with aspects of the present disclosure. The operations of method 1500 may be implemented by a data center 120 or database server 210 or its components as described herein. For example, the operations of method 1500 may be performed by a predictive model builder as described with reference to FIGS. 8 through 10. In some examples, a data center 120 or database server 210 may execute a set of codes to control the functional elements of the device to perform the functions described below. Additionally or alternatively, the data center 120 or database server 210 may perform aspects of the functions described below using special-purpose hardware.

At 1505 the data center 120 or database server 210 may receive, at a database server, a selection of a data set, wherein the data set comprises a plurality of fields. The operations of 1505 may be performed according to the methods described herein. In certain examples, aspects of the operations of 1505 may be performed by a data selector as described with reference to FIGS. 8 through 10.

At 1510 the data center 120 or database server 210 may receive, at the database server, a selection of a prediction field from the plurality of fields. The operations of 1510 may be performed according to the methods described herein. In certain examples, aspects of the operations of 1510 may be performed by a field selector as described with reference to FIGS. 8 through 10.

At 1515 the data center 120 or database server 210 may generate, by the database server, a plurality of features from the data set, wherein the plurality of features are generated automatically based at least in part on metadata associated with the data set. The operations of 1515 may be performed according to the methods described herein. In certain examples, aspects of the operations of 1515 may be performed by a feature generator as described with reference to FIGS. 8 through 10.

At 1520 the data center 120 or database server 210 may determine a score for the prediction field based at least in part on generating the predictive machine learning model, wherein transmitting the indication of the plurality of predicted values is based at least in part on the determined score. The operations of 1520 may be performed according to the methods described herein. In certain examples, aspects of the operations of 1520 may be performed by a scoring component as described with reference to FIGS. 8 through 10.

At 1525 the data center 120 or database server 210 may generate, by the database server, the predictive machine learning model based at least in part on the plurality of features. The operations of 1525 may be performed according to the methods described herein. In certain examples, aspects of the operations of 1525 may be performed by a model builder as described with reference to FIGS. 8 through 10.

At 1530 the data center 120 or database server 210 may transmit an indication of a plurality of predicted values for the prediction field based at least in part on the predictive machine learning model. The operations of 1530 may be performed according to the methods described herein. In certain examples, aspects of the operations of 1530 may be performed by a scoring component as described with reference to FIGS. 8 through 10.

A method of generating a predictive machine learning model is described. The method may include receiving, at a database server, a selection of a data set, wherein the data set comprises a plurality of fields, receiving, at the database server, a selection of a prediction field from the plurality of fields, generating, by the database server, a plurality of features from the data set, wherein the plurality of features are generated automatically based at least in part on metadata associated with the data set, generating, by the database server, the predictive machine learning model based at least in part on the plurality of features, and transmitting an indication of a plurality of predicted values for the prediction field based at least in part on the predictive machine learning model.

An apparatus for generating a predictive machine learning model is described. The apparatus may include means for receiving, at a database server, a selection of a data set, wherein the data set comprises a plurality of fields, means for receiving, at the database server, a selection of a prediction field from the plurality of fields, means for generating, by the database server, a plurality of features from the data set, wherein the plurality of features are generated automatically based at least in part on metadata associated with the data set, means for generating, by the database server, the predictive machine learning model based at least in part on the plurality of features, and means for transmitting an indication of a plurality of predicted values for the prediction field based at least in part on the predictive machine learning model.

Another apparatus for generating a predictive machine learning model is described. The apparatus may include a processor, memory in electronic communication with the processor, and instructions stored in the memory. The instructions may be operable to cause the processor to receive, at a database server, a selection of a data set, wherein the data set comprises a plurality of fields, receive, at the database server, a selection of a prediction field from the plurality of fields, generate, by the database server, a plurality of features from the data set, wherein the plurality of features are generated automatically based at least in part on metadata associated with the data set, generate, by the database server, the predictive machine learning model based at least in part on the plurality of features, and transmit an indication of a plurality of predicted values for the prediction field based at least in part on the predictive machine learning model.

A non-transitory computer-readable medium for generating a predictive machine learning model is described. The non-transitory computer-readable medium may include instructions operable to cause a processor to receive, at a database server, a selection of a data set, wherein the data set comprises a plurality of fields, receive, at the database server, a selection of a prediction field from the plurality of fields, generate, by the database server, a plurality of features from the data set, wherein the plurality of features are generated automatically based at least in part on metadata associated with the data set, generate, by the database server, the predictive machine learning model based at least in part on the plurality of features, and transmit an indication of a plurality of predicted values for the prediction field based at least in part on the predictive machine learning model.

Some examples of the method, apparatus, and non-transitory computer-readable medium described above may further include processes, features, means, or instructions for evaluating a statistical relationship between the plurality of predicted values for the prediction field and a subset of the plurality of features. Some examples of the method, apparatus, and non-transitory computer-readable medium described above may further include processes, features, means, or instructions for removing at least one feature of the subset of the plurality of features from the predictive machine learning model if the statistical relationship exceeds a threshold.

In some examples of the method, apparatus, and non-transitory computer-readable medium described above, the statistical relationship comprises a correlation calculation, a Cramer's V calculation, or a combination thereof.

Some examples of the method, apparatus, and non-transitory computer-readable medium described above may further include processes, features, means, or instructions for training a plurality of candidate machine learning models. Some examples of the method, apparatus, and non-transitory computer-readable medium described above may further include processes, features, means, or instructions for evaluating the plurality of candidate machine learning models based at least in part on a predictive accuracy of each of the plurality of candidate machine learning models. Some examples of the method, apparatus, and non-transitory computer-readable medium described above may further include processes, features, means, or instructions for selecting the predictive machine learning model based at least in part on the evaluating.

Some examples of the method, apparatus, and non-transitory computer-readable medium described above may further include processes, features, means, or instructions for adjusting a sampling rate of the data set based at least in part on a representation rate of the plurality of predicted values.

Some examples of the method, apparatus, and non-transitory computer-readable medium described above may further include processes, features, means, or instructions for determining a score for the prediction field based at least in part on generating the predictive machine learning model, wherein transmitting the indication of the plurality of predicted values may be based at least in part on the determined score.

Some examples of the method, apparatus, and non-transitory computer-readable medium described above may further include processes, features, means, or instructions for receiving a new record associated with the data set. Some examples of the method, apparatus, and non-transitory computer-readable medium described above may further include processes, features, means, or instructions for updating the score for the prediction field based at least in part on the new record.

Some examples of the method, apparatus, and non-transitory computer-readable medium described above may further include processes, features, means, or instructions for storing the score in the database server.

In some examples of the method, apparatus, and non-transitory computer-readable medium described above, the receiving the selection of the data set comprises receiving an indication of an object, wherein the indication of the plurality of predicted values may be based at least in part on receiving the indication of the object.

Some examples of the method, apparatus, and non-transitory computer-readable medium described above may further include processes, features, means, or instructions for receiving an indication of one or more additional objects, wherein the indication of the plurality of predicted values may be based at least in part on receiving the indication of the one or more additional objects.

Some examples of the method, apparatus, and non-transitory computer-readable medium described above may further include processes, features, means, or instructions for receiving a selection of prediction fields from the plurality of fields, wherein the plurality of features from the data set may be generated based at least in part on the selection of prediction fields.

Some examples of the method, apparatus, and non-transitory computer-readable medium described above may further include processes, features, means, or instructions for saving the plurality of predicted values to the prediction field based at least in part on transmitting the indication of the plurality of predicted values.

In some examples of the method, apparatus, and non-transitory computer-readable medium described above, the database server comprises a multi-tenant database server.

In some examples of the method, apparatus, and non-transitory computer-readable medium described above, the metadata associated with the data set comprises a classification of a field and a data type of the field.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for generating a predictive machine learning model at a database system, comprising:
   receiving, from a cloud client of the database system via a user interface associated with the database system, a selection of a data set comprising a plurality of fields;
   identifying metadata associated with the selected data set based at least in part on retrieving the selected data set from a data center of the database system, the metadata indicating respective data types and classifications of the plurality of fields in the selected data set;
   receiving, from the cloud client via the user interface, a selection of a prediction field from the plurality of fields in the selected data set;
   generating a plurality of features at a server of the database system based at least in part on the identified metadata associated with the selected data set, the plurality of features identifying relationships between the selected prediction field and other fields in the selected data set;
   generating a plurality of candidate predictive machine learning models at the server based at least in part on the plurality of features;
   selecting, from the plurality of candidate predictive machine learning models generated at the server, a predictive machine learning model that satisfies a threshold level of accuracy with respect to the selected prediction field; and
   transmitting, to the cloud client for display in the user interface, an indication of a plurality of predicted values for the selected prediction field, wherein the plurality of predicted values are generated at the server using the selected predictive machine learning model.

2. The method of claim 1, further comprising:
   evaluating a statistical relationship between the plurality of predicted values for the prediction field and a subset of the plurality of features; and
   removing at least one feature of the subset of the plurality of features from the predictive machine learning model if the statistical relationship exceeds a threshold.

3. The method of claim 2, wherein the statistical relationship comprises a correlation calculation, a Cramer's V calculation, or a combination thereof.

4. The method of claim 1, further comprising:
   training the plurality of candidate predictive machine learning models using the plurality of features; and
   evaluating the plurality of candidate predictive machine learning models based at least in part on a predictive accuracy of each of the plurality of candidate machine learning models wherein selecting the predictive machine learning model is based at least in part on the evaluating.

5. The method of claim 1, further comprising:
   adjusting a sampling rate of the selected data set based at least in part on a representation rate of the plurality of predicted values.

6. The method of claim 1, further comprising:
   determining a score for the prediction field based at least in part on generating the predictive machine learning model, wherein transmitting the indication of the plurality of predicted values is based at least in part on the determined score.

7. The method of claim 6, further comprising:
receiving a new record associated with the selected data set; and
updating the score for the prediction field based at least in part on the new record.

8. The method of claim 6, further comprising:
storing the score in a database server of the database system.

9. The method of claim 1, wherein receiving the selection of the data set comprises:
receiving an indication of an object, wherein the indication of the plurality of predicted values is based at least in part on receiving the indication of the object.

10. The method of claim 9, further comprising:
receiving an indication of one or more additional objects, wherein the indication of the plurality of predicted values is based at least in part on receiving the indication of the one or more additional objects.

11. The method of claim 1, further comprising:
receiving a selection of prediction fields from the plurality of fields, wherein the plurality of features from the selected data set are generated based at least in part on the selection of prediction fields.

12. The method of claim 1, further comprising:
saving the plurality of predicted values to the prediction field based at least in part on transmitting the indication of the plurality of predicted values.

13. The method of claim 1, wherein the database system comprises a multi-tenant database system.

14. An apparatus for generating a predictive machine learning model at a database system, comprising:
a processor;
memory in electronic communication with the processor; and
instructions stored in the memory and executable by the processor to cause the apparatus to:
receive, from a cloud client of the database system via a user interface associated with the database system, a selection of a data set comprising a plurality of fields;
identify metadata associated with the selected data set based at least in part on retrieving the selected data set from a data center of the database system, the metadata indicating respective data types and classifications of the plurality of fields in the selected data set;
receive, from the cloud client via the user interface, a selection of a prediction field from the plurality of fields in the selected data set;
generate a plurality of features at a server of the database system based at least in part on the identified metadata associated with the selected data set, the plurality of features identifying relationships between the selected prediction field and other fields in the selected data set;
generate a plurality of candidate predictive machine learning models at the server based at least in part on the plurality of features;
select, from the plurality of candidate predictive machine learning models generated at the server, a predictive machine learning model that satisfies a threshold level of accuracy with respect to the selected prediction field; and transmit, to the cloud client for display in the user interface, an indication of a plurality of predicted values for the selected prediction field, wherein the plurality of predicted values are generated at the server using the selected predictive machine learning model.

15. The apparatus of claim 14, wherein the instructions are further executable by the processor to cause the apparatus to:
evaluate a statistical relationship between the plurality of predicted values for the prediction field and a subset of the plurality of features; and
remove at least one feature of the subset of the plurality of features from the predictive machine learning model if the statistical relationship exceeds a threshold.

16. The apparatus of claim 14, wherein the instructions are further executable by the processor to cause the apparatus to:
train the plurality of candidate predictive machine learning models using the plurality of features; and
evaluate the plurality of candidate predictive machine learning models based at least in part on a predictive accuracy of each of the plurality of candidate machine learning models wherein selecting the predictive machine learning model is based at least in part on the evaluating.

17. The apparatus of claim 14, wherein the instructions are further executable by the processor to cause the apparatus to:
adjust a sampling rate of the selected data set based at least in part on a representation rate of the plurality of predicted values.

18. A non-transitory computer-readable medium storing code for generating a predictive machine learning model at a database system, the code comprising instructions that are executable by a processor to:
receive, from a cloud client of the database system via a user interface associated with the database system, a selection of a data set comprising a plurality of fields;
identify metadata associated with the selected data set based at least in part on retrieving the selected data set from a data center of the database system, the metadata indicating respective data types and classifications of the plurality of fields in the selected data set;
receive, from the cloud client via the user interface, a selection of a prediction field from the plurality of fields in the selected data set;
generate a plurality of features at a server of the database system based at least in part on the identified metadata associated with the selected data set, the plurality of features identifying relationships between the selected prediction field and other fields in the selected data set;
generate a plurality of candidate predictive machine learning models at the server based at least in part on the plurality of features;
select, from the plurality of candidate predictive machine learning models generated at the server, a predictive machine learning model that satisfies a threshold level of accuracy with respect to the selected prediction field; and
transmit, to the cloud client for display in the user interface, an indication of a plurality of predicted values for the selected prediction field, wherein the plurality of predicted values are generated at the server using the selected predictive machine learning model.

19. The non-transitory computer-readable medium of claim 18, wherein the instructions are further executable by the processor to:
- evaluate a statistical relationship between the plurality of predicted values for the prediction field and a subset of the plurality of features; and
- remove at least one feature of the subset of the plurality of features from the predictive machine learning model if the statistical relationship exceeds a threshold.

20. The method of claim 1, wherein:
- the selected data set comprises a table with a plurality of rows that include structured data; and
- the prediction field comprises a row of the plurality of rows in the table.

* * * * *